US010429550B2

(12) United States Patent
Cho et al.

(10) Patent No.: US 10,429,550 B2
(45) Date of Patent: Oct. 1, 2019

(54) POLARIZER HAVING ADHESIVE-COVERED POLARIZING LAYER, DISPLAY DEVICE HAVING THE POLARIZER, AND METHOD OF FABRICATING THE POLARIZER

(71) Applicant: LG Display Co., Ltd., Seoul (KR)

(72) Inventors: Wonjong Cho, Seoul (KR); Wonki Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 17 days.

(21) Appl. No.: 15/394,685

(22) Filed: Dec. 29, 2016

(65) Prior Publication Data
US 2018/0003860 A1    Jan. 4, 2018

(30) Foreign Application Priority Data

Jun. 30, 2016 (KR) .................. 10-2016-0083142
Nov. 30, 2016 (KR) .................. 10-2016-0162385

(51) Int. Cl.
    *B32B 7/12*       (2006.01)
    *B32B 37/12*      (2006.01)
    (Continued)

(52) U.S. Cl.
    CPC ............ *G02B 1/14* (2015.01); *B29D 11/0073* (2013.01); *B29D 11/00644* (2013.01);
    (Continued)

(58) Field of Classification Search
    CPC . B29C 66/7338; B29D 7/01; B29D 11/00634; B29D 11/0644; B29D 11/0073;
    (Continued)

(56) References Cited

U.S. PATENT DOCUMENTS 5,705,267 A    1/1998   Starzewski et al.
2007/0165157 A1*   7/2007   Hong ................ G02F 1/133528
                                                          349/96
(Continued)

FOREIGN PATENT DOCUMENTS

CN        1153909 A      7/1997
EP         2258783       12/2010
(Continued)

OTHER PUBLICATIONS

English translation of Ito et al., JP 2010-243863 A, retrieved on Apr. 1, 2018 from https://dossier1.j-platpat.inpit.go.jp.*
(Continued)

*Primary Examiner* — Jennifer D. Carruth
*Assistant Examiner* — Ryan S Dunning
(74) *Attorney, Agent, or Firm* — Fenwick & West LLP

(57) ABSTRACT

Penetration of moisture and propagation of cracks is prevented in a polarizer. An adhesive is provided to cover one or more edges of the polarizer to seal the side section of the polarizer. The adhesive fills initial cracks to prevent the initial crack from being propagated to the inside of the polarizer. A protective film and the adhesive include a material having a hydrophobic characteristic. In a method of fabricating a polarizer, a polarizing film is shaped to form a polarizing layer, and a protective film is then attached by applying an adhesive onto the edges of the polarizing layer. Then, the adhesive is cured, and the protective film having the polarizing layer attached is processed, thereby dividing the protective film into a plurality of polarizers. The adhesive can firmly fix the crack since the adhesive is fills in cracks in the polarizing layer.

24 Claims, 18 Drawing Sheets

(51) Int. Cl.
- *B32B 37/14* (2006.01)
- *G02B 1/14* (2015.01)
- *G02B 1/18* (2015.01)
- *G02B 5/30* (2006.01)
- *B29D 11/00* (2006.01)
- *B32B 27/00* (2006.01)

(52) U.S. Cl.
CPC ............... *B32B 7/12* (2013.01); *B32B 27/00* (2013.01); *B32B 37/12* (2013.01); *B32B 37/14* (2013.01); *G02B 1/18* (2015.01); *G02B 5/305* (2013.01); *G02B 5/3016* (2013.01); *G02B 5/3033* (2013.01); *G02B 5/3083* (2013.01); *B32B 2305/72* (2013.01); *B32B 2307/42* (2013.01); *B32B 2310/0831* (2013.01); *G02B 5/3041* (2013.01)

(58) Field of Classification Search
CPC ..... B29K 2995/0034; B29L 2011/0066; B32B 7/12; B32B 17/10458; B32B 37/12; B32B 37/14; B32B 2305/72; B32B 2307/42; B32B 2310/0831; C08J 5/18; C08L 33/08; C08L 51/06; C08L 2203/206; G02B 1/04; G02B 1/08; G02B 1/105; G02B 1/14; G02B 1/18; G02B 5/30; G02B 5/3016; G02B 5/3025; G02B 5/3033; G02B 5/3041; G02B 5/305; G02B 5/3083; G02B 27/28; G02B 27/286; G02F 1/133528
USPC ........... 264/1.1, 1.24, 1.27, 1.31, 1.34, 1.35, 264/1.36, 1.38, 1.6, 1.7, 2.7, 272.11; 359/487.01, 487.02, 489.01, 489.07; 427/163.1; 428/1.31
See application file for complete search history.

(56) References Cited

U.S. PATENT DOCUMENTS

| | | | | |
|---|---|---|---|---|
| 2011/0008552 | A1* | 1/2011 | Umemoto | C09J 11/06 428/1.5 |
| 2014/0176848 | A1 | 6/2014 | Gupta et al. | |
| 2015/0036074 | A1* | 2/2015 | Park | G02B 5/30 349/58 |
| 2016/0370523 | A1* | 12/2016 | Shimoju | C09J 201/00 |
| 2017/0038638 | A1* | 2/2017 | Park | G02F 1/1335 |
| 2018/0024283 | A1* | 1/2018 | Motegi | G02B 5/305 |

FOREIGN PATENT DOCUMENTS

| | | |
|---|---|---|
| JP | 2003195053 | 7/2003 |
| JP | 2006088651 | 4/2006 |
| JP | 2006195209 | 7/2006 |
| JP | 2010243863 | 10/2010 |
| KR | 20080106110 | 12/2008 |
| KR | 0932041 | 12/2009 |
| KR | 20150064291 | 6/2015 |
| KR | 20150087752 | 7/2015 |
| WO | WO 2014-175463 A1 | 10/2014 |

OTHER PUBLICATIONS

English translation of Nishida et al., JP 2006-195209 A, retrieved on Apr. 1, 2018 from https://dossier1.j-platpat.inpit.go.jp.*
Office Action for Korean Patent Application No. KR 2016-0162385, dated Nov. 9, 2017, 8 Pages, (With Concise Explanation of Relevance).
Gent, A.N. et al., "Strength of Elastomers," Chapter 10, The Science and Technology of Rubber, Fourth Edition, Edited by Burak Erman et al., 2013, pp. 473-516.
Extended European Search Report for European Patent Application No. EP 16207173.2, dated Aug. 4, 2017, 7 Pages.
European Patent Office, Communication pursuant to Article 94(3) EPC, EP Patent Application No. 16207173.2, dated Mar. 20, 2019, seven pages.
The National Intellectual Property Administration of the People's Republic of China, The First Office Action, CN Patent Application No. 201611257008.1, dated Jul. 3, 2019, 21 pages.

* cited by examiner

STRETCHING DIRECTION

POLARIZER HAVING ADHESIVE-COVERED POLARIZING LAYER, DISPLAY DEVICE HAVING THE POLARIZER, AND METHOD OF FABRICATING THE POLARIZER

CROSS-REFERENCE TO RELATED APPLICATION

Pursuant to 35 U.S.C. § 119(a), this application claims the benefit of earlier filing date and right of priority to Republic of Korea Patent Application No. 10-2016-0083142, filed in the Republic of Korea on Jun. 30, 2016, and Republic of Korea Patent Application No. 10-2016-0162385, filed in the Republic of Korea on Nov. 30, 2016, the contents of which are incorporated by reference herein in their entirety.

BACKGROUND OF THE INVENTION

1. Field of the Invention

The present disclosure relates to a polarizer and a method of fabricating the same, and more particularly, to a polarizer capable of preventing a polarizing layer from being damaged by allowing an initial crack not to be generated or allowing the generated initial crack not to be grown, a method of fabricating the polarizer, and a display device having the polarizer.

2. Description of the Conventional Art

In general, a liquid crystal display device includes two substrates disposed to be opposite to each other and a liquid crystal layer injected between the two substrates. Since liquid crystal has refractive anisotropy with respect to minor and major axes, the refractive index of light is changed while the light is being transmitted through the liquid crystal layer. Thus, a desired image is implemented by controlling the transmittance of light.

In order to control the transmittance of light, polarizers are attached to the two substrates, respectively. At this time, the directions of the optical axes of the polarizers are arranged to be parallel or vertical to each other, so that the transmittance of light incident onto and emitted from the liquid crystal layer is controlled, thereby implementing an image.

Such a polarizer may be provided in an organic light emitting display device as well as the liquid crystal display device. The polarizer is disposed on a surface of the organic light emitting display device to allow light output from an organic light emitting layer in the organic light emitting display device to be transmitted therethrough and to block light incident from the outside. Thus, the polarizer can be used to improve the visibility of the organic light emitting display device.

FIG. 1 is a view illustrating a structure of a conventional polarizer 10 provided in a display device. As shown in FIG. 1, the conventional polarizer 10 includes a polarizing layer 12 that polarizes incident light in a set direction by allowing a light component in a specific direction in the incident light to be transmitted therethrough and absorbing light components in other directions in the incident light. The polarizer 10 also includes adhesives 14 and 15 respectively applied onto both surfaces of the polarizing layer 12, and protective films 17 and 18 respectively attached on both the surfaces of the polarizing layer 12 by the adhesives 14 and 15.

The polarizing layer 12 is configured by adsorbing and dying iodine or dichroic pigments onto a polyvinyl alcohol (PVA)-based resin film ("PVA film") and then aligning the iodine or dichroic pigments in one direction through a uniaxial alignment. Each of the protective films 17 and 18 is configured as a triacetyl cellulose (TAC)-based film.

However, the polarizer 10 having the above-described structure has a problem as follows. The polarizer 10 is formed by attaching a large-area PVA film and large-area protective films 17 and 18 on both surfaces of the large-area PVA film by the adhesives 14 and 15. Subsequently, the PVA film and with the protective films 17 and 18 attached are divided into a plurality of pieces by mechanically cutting the large-area film. Therefore, edges of cut pieces of the PVA film and the protective films 17 and 18 in the fabricated polarizer 10 are externally exposed.

In this case, an initial crack C is generated at edges of the PVA film due to mechanical impact of cutting the PVA film with the protective films 17 and 18 attached. The initial crack C is propagated to the inside of the PVA film as the PVA film is expanded and contracted by heat and moisture generated during a process of fabricating the display device. The propagation of the crack becomes an important cause that the polarizer 10 is damaged.

Meanwhile, PVA is a hydrophilic material. Hence, when the polarizer 10 is fabricated using the PVA material, the polarizer 10 is weak to moisture due to low moisture resistance, and therefore, external moisture penetrates into the PVA film. Since the penetration of moisture increases the humidity content of the PVA, the polarizing performance of the PVA is lowered, and the PVA film expands and contracts. Therefore, the initial crack C generated due to cutting of the PVA film grows and propagates to the inside of the PVA film. The propagation of the crack becomes an important cause that the polarizer 10 is damaged.

SUMMARY OF THE INVENTION

Therefore, an aspect of the detailed description is to provide a polarizer capable of preventing a polarizing layer from being damaged by allowing an initial crack not to be generated or allowing the generated initial crack not to be grown.

Another aspect of the detailed description is to provide a display device having the polarizer.

To achieve these and other advantages and in accordance with the purpose of this specification, as embodied and broadly described herein, an adhesive is disposed on a side section of a polarizing layer to seal the side section, so that it is possible to prevent the side section of the polarizing layer from being exposed to the outside. Since the side section of the polarizing layer is not exposed to the outside by the adhesive, it is possible to prevent moisture from penetrating into the polarizing layer. In addition, it is possible to prevent an initial crack generated in the polarizing layer from being grown and propagated to the inside of the polarizing layer.

Furthermore, even when an initial crack is generated in the polarizing layer, the adhesive is filled in the initial crack. Thus, the crack is firmly fixed by the adhesive, so that the growth of the initial crack can be prevented. The adhesive may be disposed on the entire outer circumference of the polarizing layer, or may be disposed on the side section vertical to the stretching direction of the polarizing layer.

The polarizing layer may be made of a polyvinyl alcohol (PVA)-based resin containing iodine or dichroic pigment, and the adhesive may be made of an acrylic material having a hydrophilic group. The protective film may be made of an acrylic material.

The adhesive disposed on the side section of the polarizing layer may be formed to have a thickness of 1 μm to 10 μm and a width of 1 μm to 1.5 mm.

A compensating layer that changes a polarization state of light may be provided in the polarizer. The compensating layer changes a polarization state of incident light, to prevent a viewing angle characteristic from being lowered (liquid crystal display device) or prevent visibility from being lowered by reflected light (organic light emitting display device).

The compensating layer may be configured as a compensating film having quarter wave plate (QWP) and half wave plate (HWP) retardation characteristics or a single film or single layer of curable liquid crystal, and may be configured as a double film or double layer thereof. The compensating layer may be configured as a reversely dispersed compensating layer or a positive/negative C-compensating layer.

To achieve these and other advantages and in accordance with the purpose of this specification, as embodied and broadly described herein, a display device includes a display panel on which an image is implemented and a polarizer. The polarizer includes a polarizing layer disposed on at least one surface of the display panel, first and second adhesives respectively disposed on top and bottom surfaces of the polarizing layer, first and second protective films respectively attached to the top and bottom surfaces of the polarizing layer by the first and second adhesives, and a third adhesive disposed on at least one side section of the polarizing layer to seal the side section of the polarizing layer. The display panel may be a liquid crystal panel or an organic light emitting display panel.

The polarizer is fabricated by forming a plurality of polarizing layers, applying an adhesive onto bottom, top, and side surfaces of the polarizing layer, respectively attaching first and second protective films to the bottom and top surfaces of the plurality of polarizing layers, and then cutting the first and second protective films.

The applying of the adhesive may include filling the adhesive in a crack generated in the side section of the polarizing layer, and the first and second protective films are cut in a region spaced apart by a set distance from the polarizing layer. The providing of the plurality of polarizing layers may include forming the plurality of polarizing layers by processing a polarizing film, and the processing of the polarizing film may be performed using a laser or cutting tool.

Embodiments also relate to a polarizer. The polarizer includes a polarizing layer and a first protective film on a first surface of the polarizing layer. An area of a surface of the first protective film parallel to the first surface is larger than an area of the first surface of the polarizing layer. The polarizer also includes a second protective film on a second surface of the polarizing layer. An area of a surface of the second protective film parallel to the second surface is larger than the area of the second surface of the polarizing layer. The polarizer also includes an adhesive between the first protective film and the second protective film, and the adhesive covers one or more edges of the polarizing layer.

Embodiments a method of fabricating a polarizer. A polarizing film is shaped to form a polarizing layer. A first protective film is attached on a first surface of the polarizing layer. An area of a surface of the first protective film parallel to the first surface is larger than an area of the first surface of the polarizing layer. An adhesive is applied on the polarizing layer to cover one or more edges of the polarizing layer. A second protective film is attached on a second surface of the polarizing layer. An area of a surface of the second protective film parallel to the second surface is larger than the area of the second surface of the polarizing layer. The adhesive is cured to secure the first protective film and the second protective film to the polarizing layer.

Further scope of applicability of the present application will become more apparent from the detailed description given hereinafter. However, it should be understood that the detailed description and specific examples, while indicating exemplary embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF EXEMPLARY EMBODIMENTS

Description will now be given in detail of the exemplary embodiments, with reference to the accompanying drawings. For the sake of brief description with reference to the drawings, the same or equivalent components will be provided with the same reference numbers, and description thereof will not be repeated.

Figure 2A:
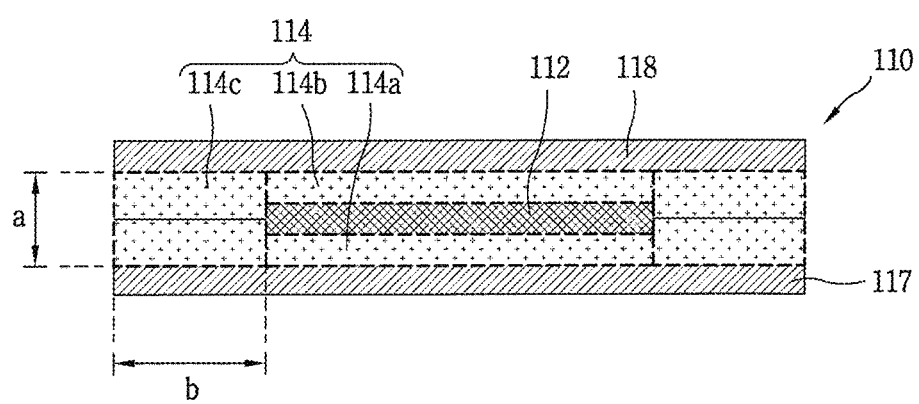
FIGS. 2A and 2B are views each illustrating a structure of a polarizer according to a first exemplary embodiment.
Figure 2B:
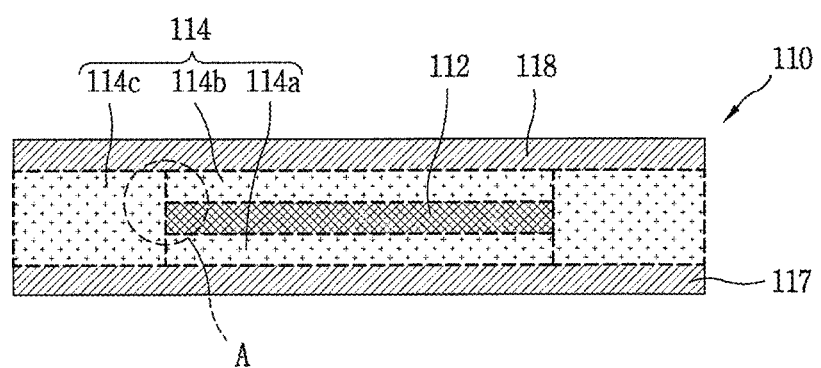

FIGS. 2A and 2B are views each illustrating a structure of a polarizer 110 according to a first exemplary embodiment.

As shown in FIGS. 2A and 2B, the polarizer 110 according to this exemplary embodiment includes a polarizing layer 112 having an optical axis formed in one axial direction to allow a light component in a set direction in incident light to be transmitted therethrough, an adhesive 114 applied onto each of top and bottom surfaces of the polarizing layer 112, and first and second protective films 117 and 118 respectively attached to the bottom and top surfaces of the polarizing layer 112 by the adhesives 114.

The polarizing layer 112 is a film capable of converting natural light into arbitrarily polarized light. In this case, when incident light is divided into two orthogonal polarization components, the polarizing layer 112 may include a film that has a function of allowing one of the two polarization components to pass therethrough and absorbing, reflecting, or scattering the other of the two polarization components. An optical film used in the polarizing layer 112 may include a polymer film using, as a main component, a polyvinyl alcohol (PVA)-based resin containing iodine or dichroic pigments. Here, the iodine or dichroic pigments are uniaxially stretched to be aligned in one direction.

Meanwhile, in the present disclosure, the polarizing layer 112 may include another material instead of the PVA-based resin. For example, the polarizing layer 112 may include an O-type polarizer obtained by aligning a liquid crystalline composition containing a dichroic material and a liquid crystalline compound in a certain direction, an E-type polarizing material obtained by aligning lyotropic liquid crystals in a certain direction, and the like.

Each of the first and second protective films 117 and 118 is configured as a transparent film having no phase delay, to protect the polarizing layer 112. The first and second protective films 117 and 118 may mainly include triacetyl cellulose (TAC), polyethylene terephthalate (PET), cyclo-olefin polymer (COP), or a combination thereof.

Particularly, in the present disclosure, an acrylic film may be used as the first and second protective films 117 and 118. Since an acrylic material has a hydrophobic characteristic, when the fabricated polarizer 110 is exposed to a high-humidity environment, it is possible to prevent moisture from penetrating into the polarizing layer 112 through the first and second protective films 117 and 118.

When moisture penetrates into the polarizing layer 112, the polarizing performance of the polarizing layer 112 is lowered. In addition, an initial crack formed in the polarizing layer 112 is propagated to the inside of the polarizing layer 112 due to expansion and contraction of the polarizing layer 112 caused by moisture, and therefore, the polarizer 110 may be damaged. Thus, in the present disclosure, the first and second protective films 117 and 118 for protecting the polarizing layer 112 are formed of a material having a hydrophobic characteristic, so that it is possible to prevent the penetration of moisture through the first and second protective films 117 and 118.

In addition, the first and second protective films 117 and 118 may be surface-treated. When the polarizer 110 is applied to an organic light emitting display device, the polarizer 110 is disposed on a front surface of the organic light emitting display device to block light reflected from the display device under the polarizer 110, thereby improving the visibility of the display device. In the present disclosure, as the first and second protective films 117 and 118 are surface-treated, it is possible to block light reflected from the display device under the polarizer 110 and to block or scatter light reflected from the surfaces of the polarizer 110, i.e., the first and second protective films 117 and 118, thereby improving the visibility of the display device.

The surface treatment of the first and second protective films 117 and 118 may be performed using a hard coating technique that lowers the intensity of reflected light by coating inorganic and organic layers having high strength on the surface of a protective film. The surface treatment may also be performed using an anti-glare (AG) technique of scattering reflected light by forming a transparent insulating layer on which Si beads or polymer beads are scattered. The surface treatment may also be performed using a low reflection (LR) technique of scattering reflected light by forming a prism on the surface of a protective film, an anti-reflection (AR) technique of eliminating reflected light due to a difference in refractive index between a plurality low refractive layers and a plurality of high refractive layers, which are alternately formed, and the like. However, the present disclosure is not limited to the above-described techniques, and various techniques may be applied.

In this case, both of the first and second protective films 117 and 118 may be surface-treated, but only the second protective film 118 disposed at a visible side to a user of the organic light emitting display device may be surface-treated.

The adhesives 114 attach the first and second protective films 117 and 118 to the bottom and top surfaces of the polarizing layer 112, respectively. As shown in these figures, the adhesive 114 is configured to include a first region 114a disposed on the bottom surface of the polarizing layer 112 to attach the first protective film 117 to the bottom surface of the polarizing layer 112, a second region 114b disposed on the top surface of the polarizing layer 112 to attach the second protective film 118 to the top surface of the polarizing layer 112, and a third region 114c disposed on both lateral surfaces of the polarizing layer 112 to seal lateral surfaces of the polarizing layer 112. The third region 114c of the adhesive 114 allows the first and second protective films 117 and 118 to be attached to each other at the periphery of the polarizing layer 112. Thus, the adhesive 114 covers one or more edges of the polarizing layer 112.

As shown in FIG. 2A, the adhesive 114 may be formed in two layers partitioned with the polarizing layer 112 interposed therebetween. As shown in FIG. 2B, the adhesive 114 may be formed in a single layer.

As described above, the adhesive 114 of the polarizer 110 may be formed in two layers or may be formed in a single layer. However, in the aforementioned description and the following description, the adhesive 114 will be described as the first to third regions 114a, 114b, and 114c by considering a functional aspect of the adhesive 114.

The adhesive 114 is a hydrophobic adhesive, and may include a photocurable acrylic material.

The acrylic adhesive 114 of the present disclosure may include one or more kinds of acrylic monomers having a hydrophilic group, a radical polymerization initiator, an epoxy resin, an iodine initiator that is a cationic photopolymerization initiator, and a photosensitizer.

More specifically, the adhesive 114 includes 5% to 70% by weight of the one or more kinds of acrylic monomers having the hydrophilic group, 0.5% to 10% by weight of the radical polymerization initiator, 30% to 90% by weight of the epoxy resin, 1% to 10% by weight of the iodine initiator, and 0.0001% to 5% by weight of the photosensitizer. Preferably, the adhesive may include 20% to 60% by weight of the one or more kinds of acrylic monomers having the hydrophilic group, 0.5% to 5% by weight of the radical polymerization initiator, 40% to 80% by weight of the epoxy resin, 2% to 8% by weight of the iodine initiator, and 0.0001% to 3% by weight of the photosensitizer.

When the content of the acrylic monomer having the hydrophilic group is less than 5% by weight, the adhesion of the adhesive 114 is lowered. When the content of the acrylic monomer having the hydrophilic group exceeds 70% by weight, the water resistance of the polarizer 110 and the adhesion are lowered. When the content of the epoxy resin is less than 30% by weight, the reliability of water resistance and durability is lowered. When the content of the epoxy resin exceeds 90% by weight, the compatibility is lowered, and the viscosity increases. When the content of the radical polymerization initiator is less than 0.5% by weight, the content of a cationic polymerization component increases, and therefore, the curing speed is lowered. When the content of the radical polymerization initiator exceeds 10% by weight, the compatibility and the optical durability are lowered. When the content of the iodine initiator is less than 1% by weight, the curability of the adhesive is lowered, and therefore, the adhesive is not cured. When the content of the iodine initiator exceeds 10% by weight, the optical durability is lowered. When the content of the photosensitizer is less than 0.0001% by weight, the reactivity of the iodine initiator is lowered. When the content of the photosensitizer exceeds 10% by weight, the color sense of the photosensitizer or the optical property related to high refractivity may be influenced.

The epoxy resin constituting the adhesive 114 may include a combination of a first epoxy compound containing one or more epoxidized aliphatic ring groups and a second epoxy compound containing one or more glycidyl ether groups.

The epoxidized aliphatic ring group of the first epoxy compound may be preferably an epoxidized cyclohexyl group, more particularly, a 3,4-epoxycyclohexylmethyl group, and may be at least one material selected from the group consisting of 3,4-epoxycyclohexylmethyl-3,4-epoxycyclohexane carboxylate, bis(3,4-epoxycyclohexylmethyl) adipate dicyclopentadiene dioxide, limonene dioxide, and 4-vinylcyclohexene dioxide.

The second epoxy compound is not particularly limited so long as it includes one or more glycidyl ether groups, and more particularly, may be selected from the group consisting of 1,4-cyclohexanedimethanol diglycidyl ether, a novolac-based epoxy, a bisphenol A-based epoxy, a bisphenol F-based epoxy, a brominated bisphenol-based epoxy, 1,6-hexanediol diglycidyl ether, trimethylolpropane triglycidyl ether, n-butyl glycidyl ether, aliphatic glycidyl ether (C12-C14), 2-ethylhexyl glycidyl ether, phenyl glycidyl ether, o-cresyl glycidyl ether, and nonyl phenyl glycidyl ether.

The hydrophilic group of the acrylic monomer may be a hydroxy group (—OH) or a carboxy group (—COOH), and preferably, may be a hydroxy group (—OH). Particular examples of the monomer having the hydrophilic group may be selected from the group consisting of hydroxyethyl acrylate (HEA), hydroxyethyl methacrylate, hydroxypropyl acrylate, hydroxypropyl methacrylate, hydroxybutyl acrylate, and mixtures thereof. However, the present disclosure is not limited thereto, and may include a monomer containing a hydrophilic group well known in the art.

The cationic photopolymerization initiator is a compound producing cationic species or a Lewis acid by the irradiation of active energy rays, and a cationic photopolymerization initiator available in the present disclosure may be the iodine initiator.

The iodine initiator may be used in an amount of 1% to 10% by weight, preferably, 2% to 8% by weight, more preferably, 3% to 5% by weight, based on 100% by weight of an adhesive composition. In addition, the photosensitizer may be used in an amount of 0.0001% to 5% by weight, preferably, 0.0005% to 3% by weight, more preferably, 0.001% to 2% by weight.

As described above, in the present disclosure, an acrylic adhesive is used as the adhesive 114. Since the acrylic adhesive has a hydrophobicity, the penetration of moisture through the adhesive 114 can be prevented in the polarizer 100 of the present disclosure. However, the adhesive 114 of the present disclosure is not limited to the acrylic adhesive, and any adhesive material is available as long as it is a hydrophobic adhesive.

As described above, when moisture penetrates into the polarizing layer 112, the polarization function of the polarizing layer 112 is lowered. In addition, an initial crack formed in the polarizing layer 112 can be propagated to the inside of the polarizing layer 112 due to expansion and contraction of the polarizing layer 112 caused by the moisture, and therefore, the polarizer 110 may be damaged. However, in the present disclosure, the adhesive 114 is made of a material having a hydrophobic characteristic, so that the penetration of moisture through the adhesive 114 can be prevented.

Meanwhile, a hydrophilic group is contained in the acrylic monomer constituting the adhesive 114 so as to improve the adhesion of the adhesive 114. That is, since the PVA film constituting the polarizing layer 112 is a hydrophilic material, when the protective films 117 and 118 are adhered by applying a hydrophobic adhesive (e.g., an acrylic adhesive) onto the hydrophilic polarizing layer 112, the adhesion of the adhesive 114 is weakened due to low attraction. In order to prevent low adhesion, the adhesion of the hydrophobic acrylic adhesive 114 and the hydrophilic polarizing layer 112 is improved by adding a hydrophilic functional group to the hydrophobic acrylic monomer, so that the adhesion of the adhesive 114 is reinforced.

At this time, 5% to 70% by weight of the one or more kinds of acrylic monomers having the hydrophilic group is added to the adhesive 114. Thus, the adhesion of the polarizing layer 112 can be improved, and it is possible to prevent moisture from penetrating into the polarizing layer 112 at the same time.

However, the adhesive 114 of the present disclosure is not limited to the photocurable adhesive configured above, and various kinds of adhesives currently known in the art, such as the photocurable adhesive, may be used.

As shown in FIGS. 2A and 2B, the polarizing layer 112 is configured to have a smaller area than the area of the first and second protective films 117 and 118. Specifically, an area of a first surface of the polarizing layer 112 on which the first protective film 117 is disposed is smaller than an area of a surface of the first protective film 117 parallel to the first surface. An area of a second surface of the polarizing layer 112 on which the second protective film 118 is disposed is smaller than an area of a surface of the second protective film 118 parallel to the second surface. Thus, each of the first and second protective films 117 and 118 is disposed such that boundaries of the protective films 117 and 118 extend beyond the boundaries of the polarizing layer 112 by a certain distance. The adhesive 114, i.e., the third region 114c of the adhesive 114, is disposed between the first and second protective films 117 and 118 around the periphery of the polarizing layer 112 to cover one or more edges of the polarizing layer 112. In the conventional polarizer, the outer side section of the polarizing layer is externally exposed. On the other hand, in the present disclosure, the third region 114c is disposed between the first and second protective films 117 and 118 to seal the lateral surfaces of the polarizing layer 112. Thus, the third region 114c of the adhesive 114 covers one or more edges of the polarizing layer 112.

In this case, each of the first and second regions 114a and 114b of the adhesive 114 may be formed to have a thickness of about 1 μm to 10 μm. Since the polarizing layer 112 is formed to have a thickness of about 1 μm to 15 μm, the third region 114c of the adhesive 114 may be formed to have a thickness of about 2 μm to 35 μm. In addition, the third region 114c may be formed to have a width b of about 1 μm to 1.5 mm. However, the thicknesses of the first, second, and third regions 114a, 114b, and 114c of the adhesive 114 and the polarizing layer 112 and the width of the third region 114c are not limited to the above-described thicknesses and width, and any thickness and width are available as long as it is possible to prevent the penetration of moisture from the outside by completely sealing the polarizing layer 112.

Meanwhile, in these figures, the adhesive 114 is formed in two adhesive layers or a single adhesive layer. However, the adhesive 114 may be configured as a separate adhesive layer formed in three layers. This will be described as follows.

Figure 3:
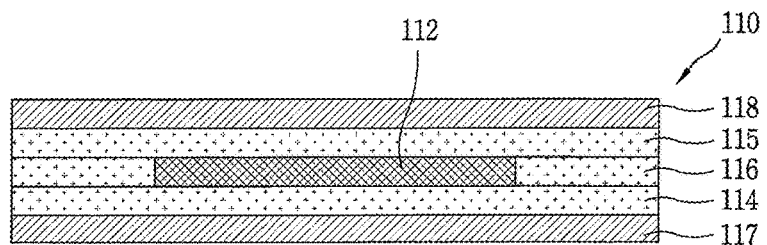
FIG. 3 is a view illustrating another structure of the polarizer according to the first exemplary embodiment.

FIG. 3 is a view illustrating another structure of the polarizer 110 according to the first exemplary embodiment.

As shown in FIG. 3, the polarizer 110 having the another structure includes a polarizing layer 112, first and second protective films 117 and 118 respectively attached to bottom and top surfaces of the polarizing layer 112 by first and second adhesives 114 and 115, and a third adhesive 116 disposed between the first and second protective films 117 and 118 at the periphery of the polarizing layer 112 to seal a lateral surface of the polarizing layer 112 and cover one or more edges of the polarizing layer 112.

The third adhesive 116 may use the same adhesive material as the first and second adhesives 114 and 115, or may use a different adhesive material from the first and second adhesives 114 and 115. However, in the present disclosure, a hydrophobic adhesive material may be used to prevent the penetration of moisture from the outside. Particularly, a hydrophobic adhesive material having a hydrophilic group may be used to attach the first and second protective films 117 and 118 to the polarizing layer 112 made of a hydrophilic material.

In this case, each of the first and second adhesives 114 and 115 may be formed to have a thickness of about 1 μm to 10 μm, and the third adhesive 116 may be formed to have a thickness of about 1 μm to 15 μm, which is substantially equal to the thickness of the polarizing layer 112. In addition, the third adhesive 116 may be formed to have a width of about 1 μm to 1.5 mm. However, the thicknesses of the first to third adhesives 114, 115, and 116 and the polarizing layer 112 and the width of the third adhesive 116 are not limited to the above-described thicknesses and width, and any thickness and width are available as long as it is possible to prevent the penetration of moisture from the outside by completely sealing the polarizing layer 112.

Figure 4:
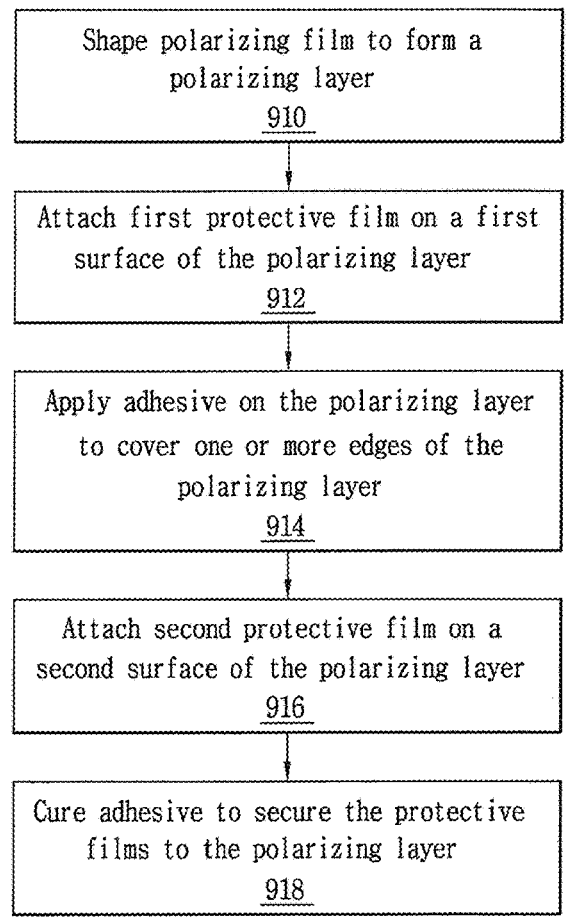
FIG. 4 is a flowchart illustrating a method of fabricating the polarizer according to the first exemplary embodiment.
Figure 5:
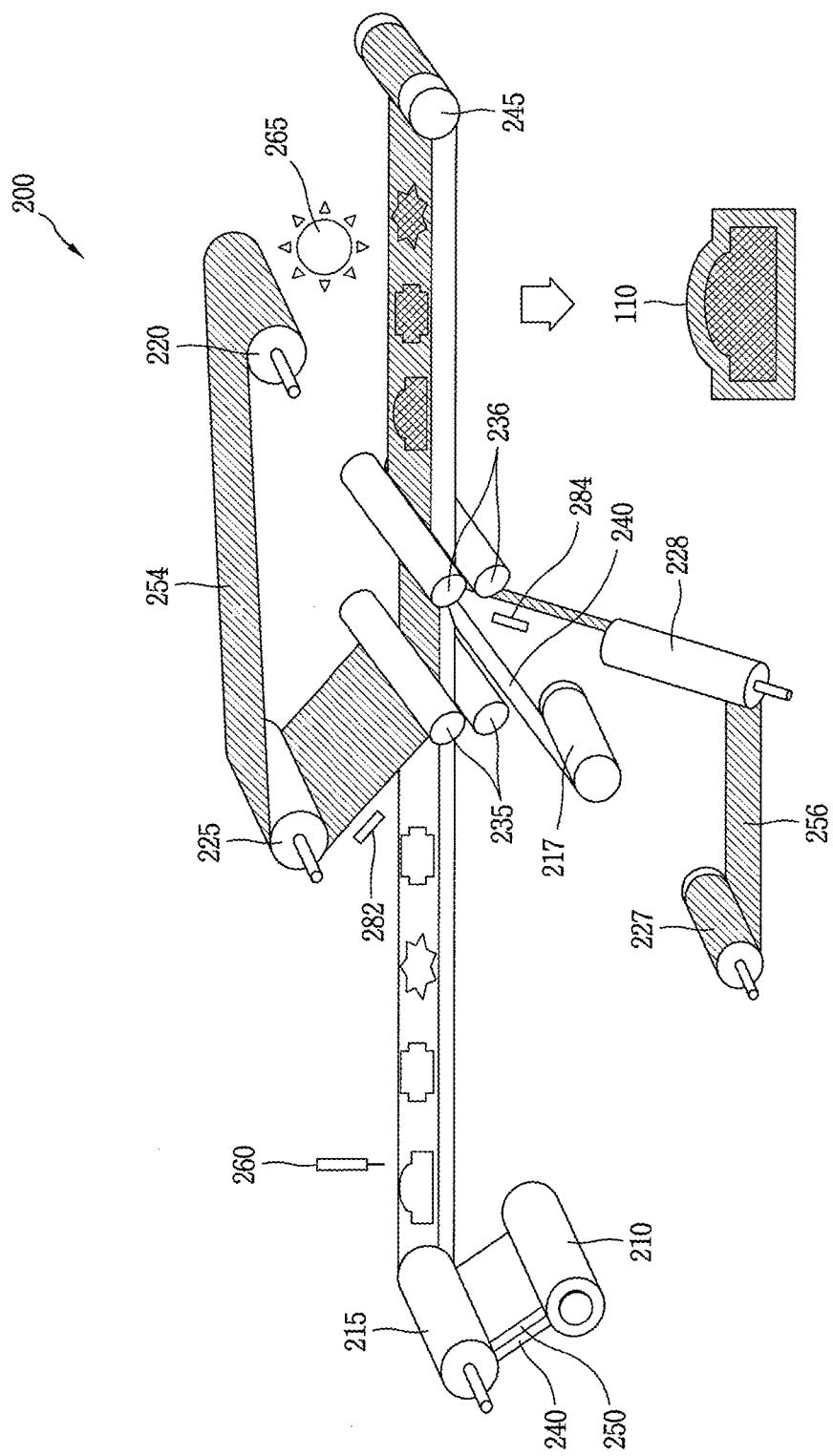
FIG. 5 is a view illustrating an apparatus for fabricating the polarizer according to the first exemplary embodiment.

FIG. 4 is a flowchart illustrating a method of fabricating the polarizer 110 according to the first exemplary embodiment. FIG. 5 is a view illustrating an apparatus for fabricating the polarizer 110 according to the first exemplary embodiment. The method of fabricating the polarizer 110 according to the first exemplary embodiment will be described in detail with reference to FIGS. 4 and 5.

As shown in FIG. 5, the apparatus 200 includes a first supply roll 210 that stretches the PVA film 250 and supplies the PVA film 250 onto a guide film 240, second and third supply rolls 220 and 227 that respectively supply first and second protective films 254 and 256 configured as acrylic films, first and second guide rolls 215 and 245 that guide the PVA film 250, third and fourth guide rolls 225 and 228 that respectively guide the first and second protective films 254 and 256, a first attaching roll 235 that attaches the first protective film 254 to the PVA film 250, a second attaching roll 236 that attaches the second protective film 256 to the PVA film 250, a separating roll 217 that separates the guide film 240, first and second adhesive supply units 282 and 284 that supply an adhesive to the respective first and second attaching rolls 235 and 236, a processing device 260 that processes the PVA film 250, and a curing device 265 that cures the adhesive applied onto the PVA film to attach the first and second protective films 254 and 256 to the PVA film 250.

As shown in FIG. 4, in the apparatus 200 having the above-described structure, the PVA film 250 is stretched and then attached to the guide film 240, and the PVA film 250 and the guide film 240 are then transferred through the first guide roll 215. The PVA film 250 is shaped 910 to form one or more polarizing layers. The first protective film is attached 912 on a first surface of the polarizing layer. An area of a surface of the first protective film parallel to the first surface is larger than the area of the first surface of the polarizing layer. The adhesive is applied 914 on the polarizing layer to cover one or more edges of the polarizing layer. The second protective film is attached 916 to a second surface of the polarizing layer. An area of a surface of the second protective film parallel to the second surface is larger than the area of the second surface of the polarizing layer. The adhesive is cured 918 to secure the protective films to the polarizing layer.

The attachment of the PVA film 250 and the guide film 240 may be performed using a separate adhesive means, or may be performed by a van der Waales force without any separate adhesive means. The PVA film 250 and the guide film 240 are separated in a subsequent process, and therefore, an adhesive material having a low viscosity may be used when the PVA film 250 and the guide film 240 are attached by the adhesive material.

Subsequently, the PVA film 250 attached to the guide film 240 is shaped using the processing device 260 such as a laser to form one or more polarizing layers. At this time, the processing device 260 processes only the PVA film 250 and does not process the guide film 240. Therefore, a plurality of processed PVA films 250 exist on a top surface of the guide film 240. A mechanical cutting tool may be used as the processing device 260, but a laser may preferably be used as the processing device 260 since the laser does not apply mechanical impact to the PVA film 250. The processing of the PVA film 250 varies depending on the shape of the display device to which the fabricated polarizer is applied. For example, when the display device has a square or rectangular shape, the polarizer provided in the display device is also shaped in a square or rectangular shape, and therefore, the PVA film 250 is also shaped in a square or rectangular shape. In addition, when the display device has a specific shape such as a concave shape, a circular shape, or an elliptical shape, the processed PVA film 250 is also formed in the corresponding shape such as a polygonal shape having steps and having a non-rectangular shape, a circular shape, or an elliptical shape.

Since the adhesive is disposed at the lateral surfaces of the four edges of the polarizing layer 112 as shown in FIGS. 2A and 2B, the PVA film 250 is shaped to have an area smaller than that of the fabricated polarizer.

Subsequently, the first and second protective films 254 and 256 are supplied using the second and third supply rolls 220 and 227. Then, the supplied first and second protective films 254 and 256 are respectively attached to top and bottom surfaces of the PVA film 250 using the first and second attaching rolls 235 and 236. At this time, the first and second adhesive supply units 282 and 284 are respectively provided in the vicinity of the first and second attaching rolls 235 and 236 to apply the adhesive to the top and bottom surfaces of the PVA film 250, so that the first and second protective films 254 and 256 are respectively attached to the top and bottom surfaces of the PVA film 250.

As shown in FIG. 5, as the first attaching roll 235 is disposed at the front end of the second attaching roll 236. The first protective film 254 is attached to a first surface of the PVA film 250, and the second protective film 256 is then attached to the bottom surface of the PVA film after a certain time elapses (after the PVA film 250 is moved to a certain distance by the first and second guide rolls 215 and 245).

Meanwhile, only one of the first and second adhesive supply units 282 and 284 may be provided. For example, when the first and second protective films 254 and 256 are attached by one adhesive as shown in FIG. 2B, the adhesive is supplied such that both of the top and bottom surfaces of the PVA film 250 are covered by one adhesive supply unit. Thus, the first and second protective films 254 and 256 can be attached to the PVA film 250.

The separating roll 217 is provided between the first and second attaching rolls 235 and 236 to separate the PVA film 250 from the guide film 240. As described above, the first protective film 254 is attached to the plurality of processed PVA films 250 by the first attaching roll 235. Thus, although the PVA film 250 is separated from the guide film 240, the plurality of PVA films 250 maintain a state in which they are attached to the first protective film 254, and the second protective film 256 is attached to the bottom surface of the separated PVA film 250 by supplying the adhesive to the bottom surface of the separated PVA film 250 from the second adhesive supply unit 284, and using the second attaching roll 236. Alternatively, the guide film 240 may be separated and simultaneously, the adhesive may be applied to the top and bottom surfaces of the PVA film 250.

The PVA film 250 is provided in a plurality of shaped films, and the first and second protective films 254 and 256 are have a width similar to that of the first and second attaching rolls 235 and 236. Thus, the first and second protective films 254 and 256 are respectively attached to the top and bottom surfaces of the PVA film 250. In addition, the first and second protective films 254 and 256 are attached to each other by the adhesive supplied to the first and second protective films 254 and 256 from the second adhesive supply unit 284. The adhesive is disposed to cover one or more processed edges of the PVA film 250.

After that, the adhesive between the PVA film 250 and the first and second protective films 254 and 256 is cured using the curing device 265. When the adhesive used in the prevent disclosure is a photocurable adhesive, the curing device 265 may be a light irradiation device that irradiates light such as ultraviolet light. When the adhesive is a thermosetting adhesive, the curing device 265 may be a heating device that applies high-temperature heat.

Subsequently, a plurality of polarizers are completed by processing the plurality of PVA films 250 and the first and second protective films 254 and 256, which are attached to each other. At this time, the processing of the PVA film 250 and the first and second protective films 254 and 256 is performed along the shape of the PVA film 250. In this case, the processing of the PVA film 250 and the first and second protective films 254 and 256 may be performed by processing (e.g., cutting) the first and second protective films 254 and 256 such that boundaries of the protective films 254 and 256 extend beyond the boundaries of the PVA film 250 by a certain distance (e.g., 1 µm to 1.5 mm).

As described above, since the PVA film 250 has a smaller area than the first and second protective films 254 and 256, and the protective films 254 and 256 extend beyond the boundaries of the processed PVA film 250, the adhesive disposed between the first and second protective films 254 and 256 at the periphery of the PVA film 250 seal one or more edges of the PVA film 250.

When the conventional polarizer is fabricated, the first and second protective films 254 and 256 are respectively attached to both surfaces of the PVA film 250, and the PVA film 250 and the first and second protective films 254 and 256, which are attached to each other, are then cut together using a mechanical cutting device, thereby forming a plurality of polarizers. Hence, the cut section of the PVA film 250 is externally exposed. In addition, a mechanical force is transferred to the PVA film 250 as it is.

Therefore, in the conventional polarizer, an initial crack is generated in the PVA film 250 and is externally exposed by the mechanical force applied during the cutting. In general, when an initial crack is generated in a film made of an organic material, it is known that, when the size of the initial crack is a set size or more, the crack will grow due to stress caused by expansion and contraction of the film. For example, if the size of an initial crack generated in a section of the film is 40 µm or more, the initial crack may grow inward toward the inside of the film. As a result, the film may be completely torn.

In the conventional polarizer, an initial crack is generated in the PVA film 250 by a mechanical force applied during the cutting. In addition, in a fabricating method of a display device having the polarizer, high-temperature heat is applied to the PVA film 250, and moisture penetrates into the PVA film 250 through its cut lateral surface exposed externally. The heat and moisture expands and contracts the PVA film 250, and the initial crack grows due to the expansion and contraction and propagates to the inside of the PVA film 250. As a result, the PVA film 250 may be completely damaged due to the propagation of the crack.

Meanwhile, in order to remove the initial crack generated by the mechanical force in the fabricating process of the conventional polarizer, the PVA film 250 and the first and second protective films 254 and 256 attached to the PVA film 250 are cut together, and the cut surfaces are polished through a polishing process to remove the initial crack. However, in order to perform the polishing process, a polishing device is provided separately from the apparatus, so that the cut polarizer is transferred to the polishing device and then polished using the polishing device. Therefore, the fabricating process is delayed. Moreover, since the separate polishing device is provided, fabricating cost is remarkably increased.

In addition, since the polishing device that polishes the conventional polarizer is mainly configured as a disk-shaped polishing roll, it is difficult to polish a polarizer having a shape such as a circular or elliptical shape, which is different from a quadrangular shape. As a result, it is impossible to fabricate a display device having a different shape.

On the other hand, in the present disclosure, it is possible to prevent damage of the PVA film 250 due to the propagation of an initial crack, and thus a separate polishing device is not required. Accordingly, it is possible to effectively prevent a delay of the fabricating process and an increase in fabricating cost. Furthermore, since polishing is not required, polarizers having various shapes can be fabricated, and display devices having various shapes can also be fabricated.

In the present disclosure, when an initial crack is generated in the cut lateral surface of the PVA film 250, i.e., the lateral surface of the polarizing layer of the polarizer, the adhesive sealing the lateral surface of the PVA film 250 can prevent initial cracks from propagating inward of the polarizing layer. This will be described in more detail with reference to FIG. 6.

Figure 6:
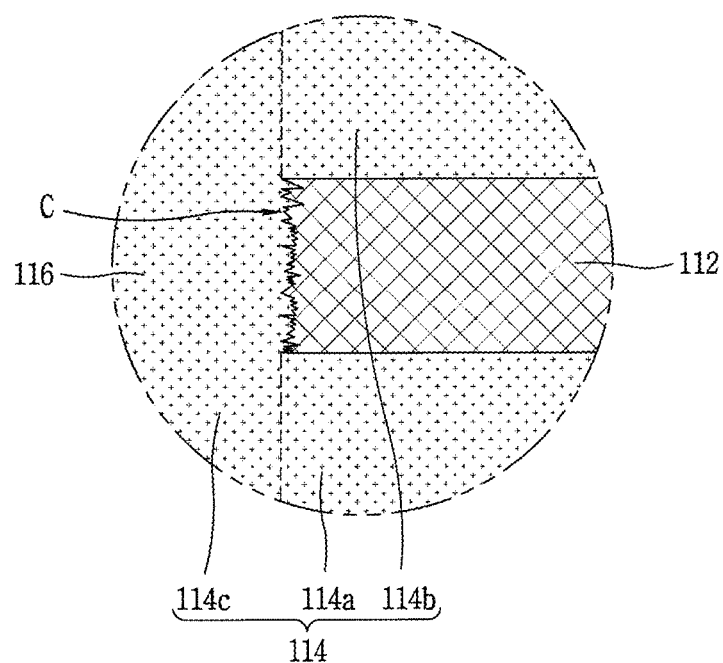
FIG. 6 is an enlarged view of region A of FIG. 2B.

FIG. 6 is an enlarged view of region A of FIG. 2B, which illustrates a boundary region between the polarizing layer 112 and the adhesive 114 of the polarizer 110.

As shown in FIG. 6, the first and second regions 114a and 114b of the adhesive 114 are provided on the top and bottom surfaces of the polarizing layer 112 to attach the first and second protective films 118 and 117 to the top and bottom surfaces of the polarizing layer 112, respectively. The third region 114c of the adhesive 114 is disposed on lateral surfaces of the polarizing layer 112 to seal the lateral surfaces of the polarizing layer 112.

The polarizing layer 112 is processed by the processing device 260 of the apparatus 200. The processing device 260 may be a laser or cutting device, and an initial crack may be generated in a cut lateral surface of the polarizing layer 112 processed by the processing device 260.

Figure 7A:
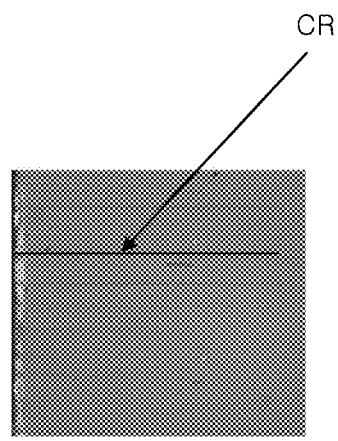
FIGS. 7A and 7B are views each illustrating a crack generated in a polarizing layer.
Figure 7B:
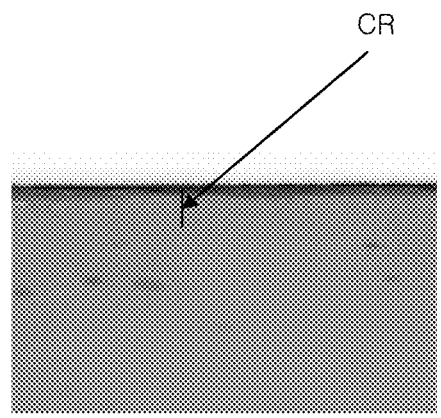

FIGS. 7A and 7B are views each illustrating an actual crack generated in the polarizing layer 112. FIG. 7A is a view illustrating a state in which an initial crack is generated along a stretching direction of the polarizing layer 112, and FIG. 7B is a view illustrating a state in which an initial crack is generated along a direction perpendicular to the stretching direction of the polarizing layer 112. Here, the cracks are indicated by lines CR.

When the polarizing layer 112 is shaped, an initial crack having a size of about 890 µm or less is generated along the stretching direction of the polarizing layer 112 as shown in FIG. 7A, and an initial crack having a size of about 100 µm or less is generated along the direction perpendicular to the stretching direction of the polarizing layer 112 as shown in FIG. 7B.

In general, when the size of an initial crack in the stretching direction is 40 µm or more, the crack is generated at the lateral surface of the polarizing layer 112 due to stress applied to the polarizing layer 112 and propagates inward the polarizing layer 112. Therefore, when an initial crack is generated as described above, the crack is propagated to the inside of the polarizing layer 112, and therefore, the polarizing layer 112 is damaged.

However, in the present disclosure, the third region 114c of the adhesive 114 fills the opening in the initial crack C even when the initial crack C is generated. Thus, the initial crack C is firmly fixed by the adhesive 114. Accordingly, the initial crack C does not grow when the polarizing layer 112 expands and contracts, as stress is not applied to the initial crack C. As a result, the initial crack C does not propagate inward the polarizing layer 112.

Furthermore, the third region 114c of the adhesive 114 covers one or more lateral surfaces of the polarizing layer 112. Thus, when heat is applied from the outside, a majority of heat reaching the polarizing layer 112 is blocked by the third region 114c, so that the expansion and contraction of the polarizing layer 112 due to heat are reduced. Accordingly, it is possible to prevent the propagation of the initial crack C due to the expansion and contraction of the polarizing layer 112. In addition, as the penetration of moisture into the lateral surface of the polarizing layer 112 is prevented by the third region 114c, it is possible to prevent the expansion and contraction of the polarizing layer 112. Accordingly, it is possible to prevent the propagation of the crack C due to the expansion and contraction of the polarizing layer 112.

In other words, in the present disclosure, the third region 114c of the adhesive 114 that seals one or more edges of the polarizing layer 112 is provided, so that the adhesive material of the adhesive 114 can firmly secure the position of an initial crack C even when the initial crack C is generated. In addition, the third region 114c prevents the expansion and contraction of the polarizing layer 112 due to heat and moisture, so that it is possible to prevent the initial crack C from being propagated inward of the polarizing layer 112 due to stress applied to the polarizing layer 112. In other words, the third region 114c of the adhesive 114 can effectively prevent an initial crack C having a small size from being propagated to the inside of the polarizing layer 112. In addition, even when a size of the initial crack C is 40 µm or more, which causes propagation of the crack, is generated in the polarizing layer 112, the adhesive material of the adhesive 114 firmly fixes the initial crack C, so that it is possible to prevent the crack C from being propagated to the inside of the polarizing layer 112.

According to the present disclosure, when an initial crack having a size of 40 µm to 1.5 mm is generated in the polarizing layer 112, the adhesive material of the adhesive 114 can prevent the initial crack from being propagated to the inside of the polarizing layer 112.

Meanwhile, the third region 114c of the adhesive 114 may be disposed along the entire periphery of the polarizing layer 112 to cover all edges of the polarizing layer 112. In other instances, the region 114c of the adhesive 114 may be disposed at some portions of the edges of the polarizing layer 112. This will be described with FIGS. 8A and 8B.

Figure 8A:
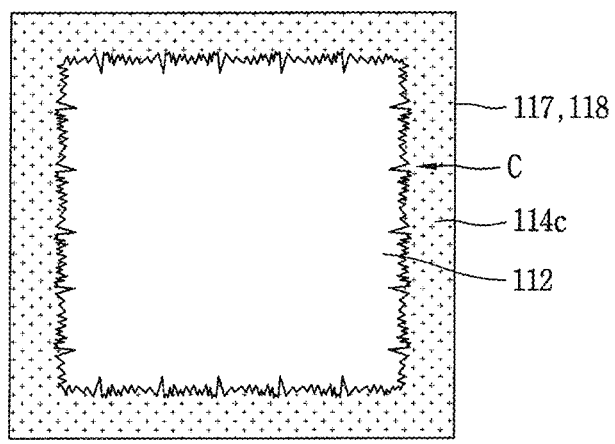
FIGS. 8A and 8B are plan views of the polarizer according to the first exemplary embodiment.
Figure 8B:
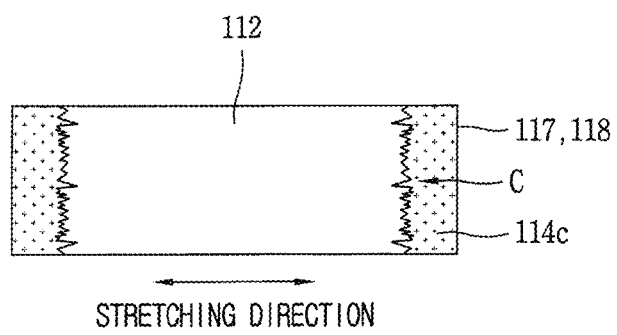

FIGS. 8A and 8B are plan views of the polarizer according to the first exemplary embodiment.

As shown in FIG. 8A, the first and second protective films 117 and 118 may be formed with a larger area than the polarizing layer 112 such that the boundaries of the four edges of each of the first and second protective films 117 and 118 extend beyond boundaries of the four edges of the polarizing layer 112 by a certain distance. When initial cracks C are generated in all edges of the polarizing layer 112, the third region 114c of the adhesive 114 is provided at the entire periphery of the polarizing layer 112 between the first and second protective films 117 and 118, so that the entire peripheral lateral surface of the polarizing layer 112 is sealed by the third region 114c of the adhesive 114. As a result, it is possible to prevent the initial crack C from being propagated inward the polarizing layer 112.

As shown in FIG. 8B, an initial crack C may be generated to partially cover lateral surfaces of the polarizing layer 112. The polarizing layer 112 has polarizability by stretching iodine or dichroic pigments in one direction. At this time, the major axis of the iodine or dichroic pigment is aligned along one direction in the polarizing layer 112. Thus, when an initial crack C is generated in the polarizing layer 112, the crack C mainly grows along the stretching direction of the polarizing layer 112 and is propagated to the inside the polarizing layer 112.

As described above, when the polarizing layer 112 is cut, an initial crack C having a size of about 890 µm or less is generated along the stretching direction of the polarizing layer 112, and an initial crack C having a size of about 100 µm or less is generated along the direction perpendicular to the stretching direction of the polarizing layer 112. That is, the size of the initial crack C generated along the direction perpendicular to the stretching direction of the polarizing layer 112 is much smaller than that of the initial crack C generated along the stretching direction of the polarizing layer 112. When the size of an initial crack C generated along the stretching direction of the polarizing layer 112 is 40 µm or more, the initial crack C is generated. However, even the size of an initial crack C generated along the direction perpendicular to the stretching direction of the polarizing layer 112 is 40 µm or more, the initial crack is not grown.

Therefore, when only an initial crack C is formed in a lateral surface that will cause the crack C to be propagated along the stretching direction of the polarizing layer 112 polarizing layer polarizing layer due to the application of heat and the penetration of moisture, the initial crack C is mainly generated along the stretching direction of the polarizing layer 112. Accordingly, in the present disclosure, the third region 114c of the adhesive 114 is disposed in only a portion of the lateral surface that will cause cracks to propagate along the alignment direction of the polarizing layer 112, and is not disposed in the other surfaces. This obtains maximum effect using the minimum amount of adhesive. For example, when the polarizing layer 112 is formed in a quadrangular shape, an initial crack C formed at a lateral surface that will cause the crack C to be propagated along the stretching direction of the polarizing layer 112, the third region 114c of the adhesive 114 may be formed on only the lateral surfaces of the polarizing layer 112 along a direction perpendicular to the stretching direction of the polarizing layer 112 polarizing layer.

However, as described above, the adhesive 114 can be provided not only on the edges that cause the cracks to be propagated in the stretching direction of the polarizing layer 112 but also on the edges of the polarizing layer 112 that cause the cracks to be propagated in a direction perpendicular to the stretching direction of the polarizing layer 112, so that it is possible to more surely prevent the propagation of an initial crack.

The polarizer 110 according to the first exemplary embodiment may be formed in various shapes. For example, the polarizer 110 may be formed in quadrangular shapes applied to electronic devices such as TVs, notebook computers, tablet computers, and cellular phones, but may be particularly effectively applied to shapes instead of the quadrangular shapes. The reason is as follows.

Figure 1:
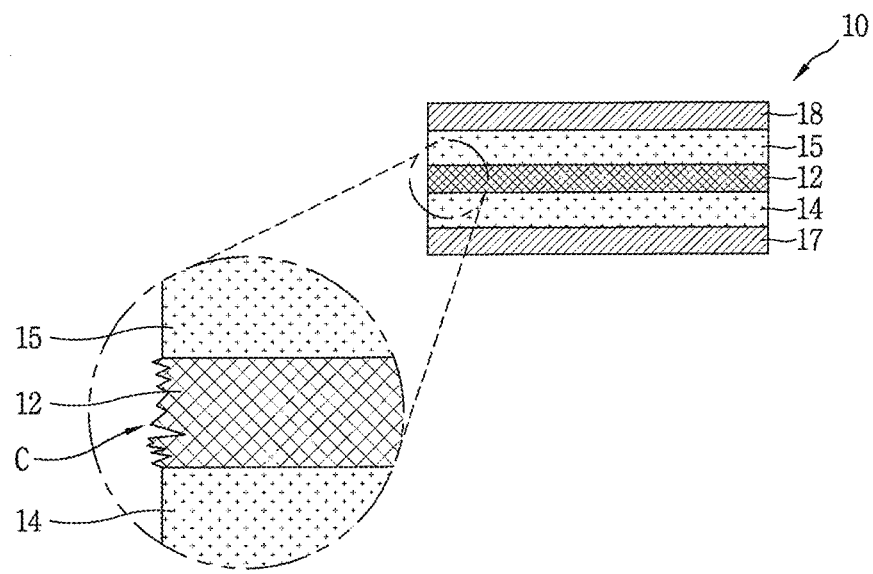
FIG. 1 is a view illustrating a structure of a conventional polarizer.
Figure 9A:
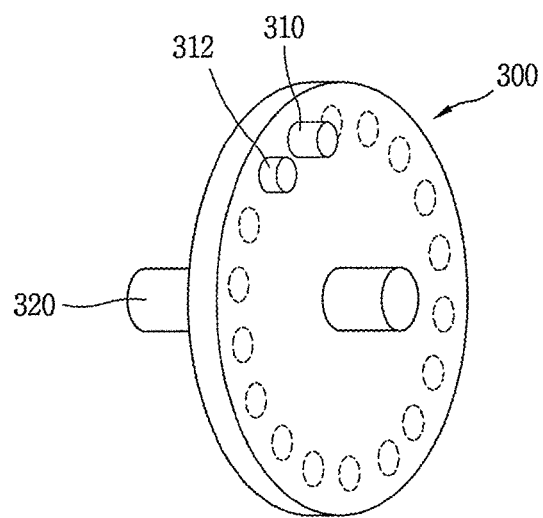
FIGS. 9A and 9B are views illustrating a polishing roll used when a general polarizer is fabricated.
Figure 9B:
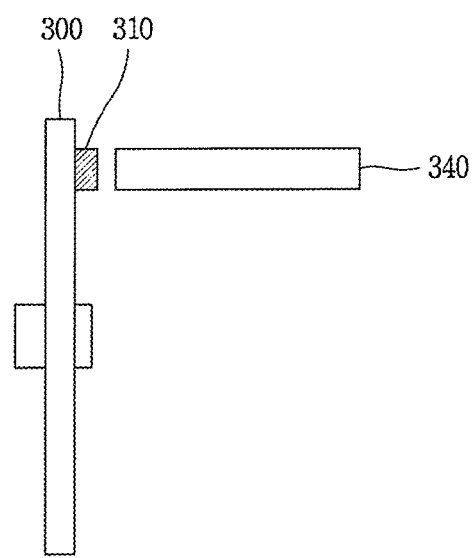

FIGS. 9A and 9B are views illustrating a polishing device for polishing a section of the conventional polarizer shown in FIG. 1 after the conventional polarizer is fabricated. As shown in FIG. 9A, the polishing device includes a disk-shaped polishing roll 300 and a plurality of polishing blades 310 and 312 disposed along a periphery of one surface of the polishing roll 300.

The polishing roll 300 rotates about a rotating shaft 320. As the polishing roll 300 rotates, the polishing blades 310 and 312 also rotate, thereby polishing a polarizer 340. The plurality of polishing blades 310 and 312 may be mounted along the circumference at the periphery of the one surface of the polishing roll 300. However, two polishing blades 310 and 312 are generally disposed.

A first polishing blade 310 is formed to have a larger height than a second polishing blade 312. Therefore, when the polarizer 340 is polished, the polarizer 340 is first polished by the first polishing blade 320 and then polished more precisely by the second polishing blade 312.

The lateral surfaces of the conventional polarizer 10 shown in FIG. 1 is polished by the polishing device, so that an initial crack generated in the side section of the polarizer 10 can be removed. Thus, although an initial crack is generated in the polarizer 10, it is possible to prevent the polarizer 10 from being damaged by the crack.

However, in the case of the polishing device, there may occur a problem when a polarizer 340 having a specific shape is polished due to the structure and shape of the polishing roll 300.

Figure 10A:
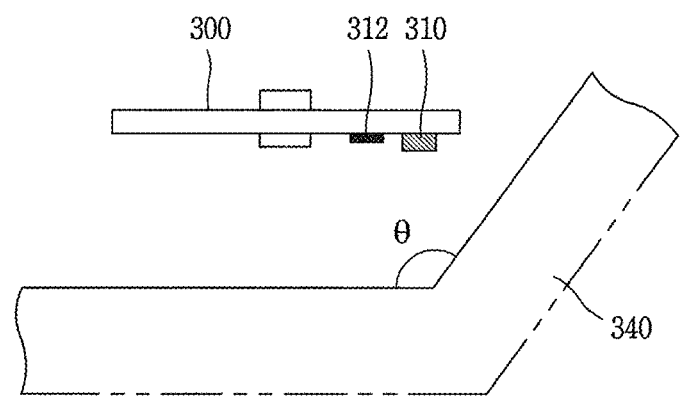
FIGS. 10A to 10C are views illustrating a state in which a polarizer having a specific shape is polished by the polishing roll.
Figure 10B:
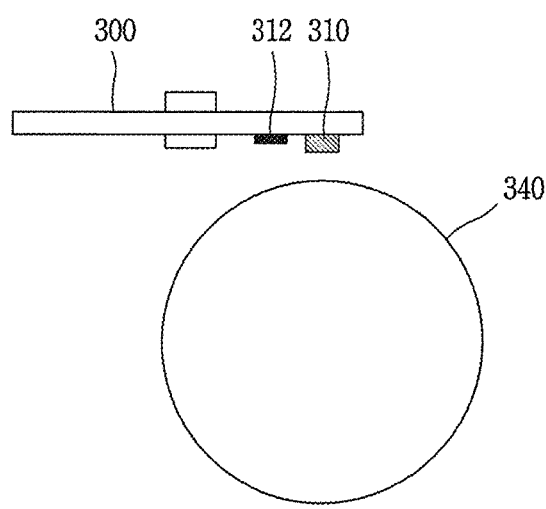
Figure 10C:
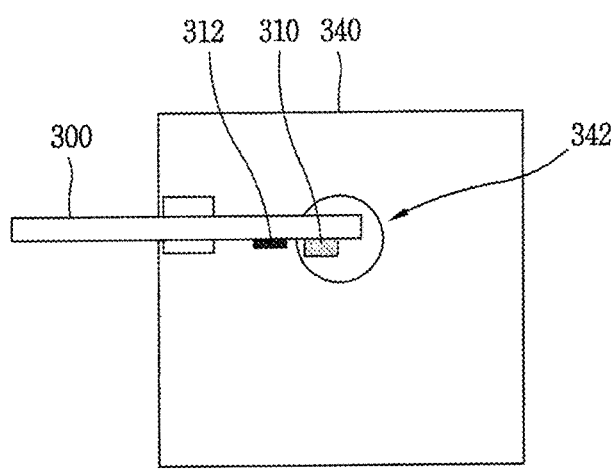

FIGS. 10A to 10C are views illustrating a state in which a polarizer 340 having a specific shape is polished by the polishing roll.

As shown in FIG. 10A, there may occur a problem when a first surface of the polarizer 340 has a shape in which a flat surface forms a predetermined angle θ with an inclined surface and is polished using the polishing device. The polishing device is formed in the shape of a disk, and the polishing blades 310 and 312 are disposed along a peripheral region of the disk 300. Hence, when the lateral surface of the polarizer 340 having the angle is polished, the polishing roll 300 interferes with the lateral surface of an adjacent side having the angle. Therefore, the lateral surface having the inward bend cannot be polished. Particularly, there occurs a problem when the section of a region near the step is polished.

In this case, the polishing may be performed differently depending on the diameter of the polishing roll 300 and the arrangement positions of the polishing blades 310 and 312. However, if the step angle θ of the adjacent lateral surfaces is 180 degrees or less (θ<180°), there may occur a problem in the polishing of the region near the step due to the structure and shape of the polishing device. If the angle θ of the adjacent surfaces becomes an acute angle (θ<90°), the polishing of the region near the step is impossible.

As shown in FIG. 10B, when the polarizer 340 is formed to have at least a portion of round curvature, a problem may also occur when the polarizer 340 is polished using the polishing device. That is, the polishing roll 300 polishes a cut surface of the polarizer 340 while performing rectilinear movement in a state in which the polishing roll 300 rotates, and therefore, the cut surface formed in the curve cannot be polished.

The polishing roll 300 may polish the cut surface while moving along the curve plural times. However, in this case, the polishing needs to be repeated multiple times, and therefore, it takes much time to fabricate the polarizer 340. In addition, although the polishing is repeated multiple times, some portions of the lateral surface of the polarizer 340 may not be polished due to the curvature of the polarizer 340. Hence, an initial crack may be propagated in the region, and therefore, the polarizer 340 may be damaged.

As shown in FIG. 10C, when a hole 342 is formed in the polarizer 340, a problem occurs when the polarizer 340 is polished using the polishing device. Since the polishing roll 300 of the polishing device polishes a cut surface of the polarizer 340 by performing rectilinear movement, a cut lateral surface of the hole 342 formed in a curve cannot be polished. In addition, when the hole 342 has a smaller size than the polishing roll 300, the polishing roll 300 cannot be located inside the hole 342, and therefore, the cut surface of the hole 342 cannot be polished.

In FIG. 10C, it has been illustrated that the hole 342 has a circular shape. However, the hole 342 formed in the polarizer 340 may be formed in various shapes such as a polygonal shape and an elliptical shape. As the hole 342 having various shapes is formed in the polarizer 340, the polishing performed by the polishing roll 300 is impossible.

As described above, when the polarizer has a bend of a specific angle, when the polarizer has a curved shape, or when the polarizer has a hole, the lateral surface of the cut polarizer cannot be polished. Hence, an initial crack is propagated to the inside of the polarizer 340, and therefore, the polarizer 340 is damaged.

Recently, a display device such as a liquid crystal display device or an organic light emitting display device has been frequently applied to not only TVs, notebook computers, cellular phones, and the like, but also watches or specific electronic devices. The display device used in such electronic devices is not formed in a quadrangular shape but formed in various shapes.

However, when the conventional polarizer is fabricated in a specific shape, lateral surfaces of the polarizer that are cut cannot be polished, and an initial crack is generated and grown. As a result, the fabricated polarizer is damaged. Therefore, a display device having a specific shape cannot be fabricated using the conventional polarizer.

The polarizer of the present disclosure can be applied to not only a general display device formed in a quadrangular shape but also a display device having various shapes as described above. That is, in the present disclosure, the generation of an initial crack can be prevented. In addition, although the initial crack is generated, it is possible to prevent the initial crack from being propagated to the inside of the polarizer. Thus, the polarizer of the present disclosure can be applied to not only a general display device having a quadrangular shape but also a display device having various shapes.

Figure 11A:
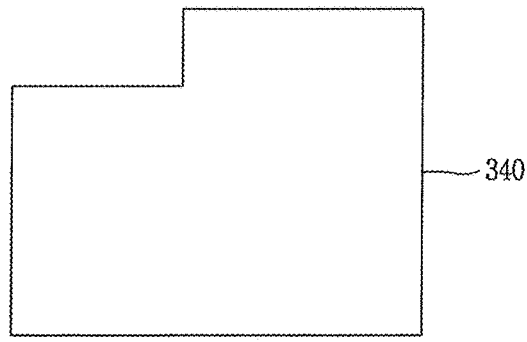
FIGS. 11A to 11C are views illustrating shapes of the polarizer.
Figure 11B:
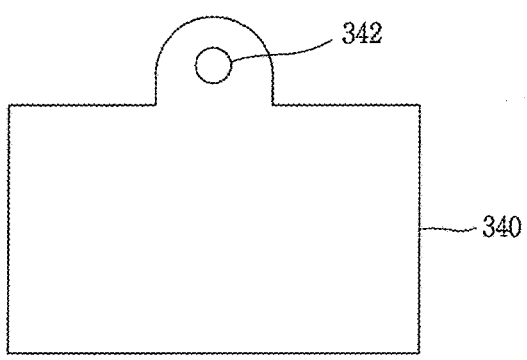
Figure 11C:
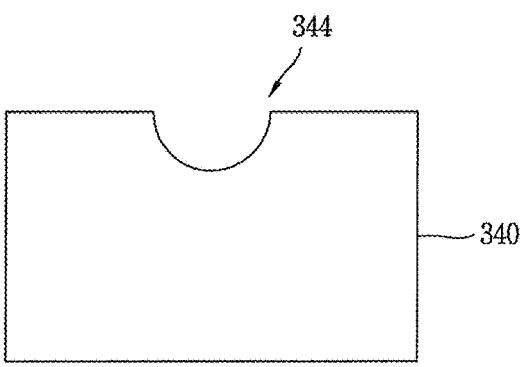

FIGS. 11A to 11C are views illustrating shapes of the polarizer 340.

As shown in FIG. 11A, the polarizer 340 of the present disclosure may be formed in a shape having a bend. In FIG. 11A, it has been illustrated that the step is vertically formed. However, the bend may be formed in various shapes including a shape of 180° or less, a shape of an acute angle, and the like. Also, in FIG. 11A, it has been illustrated that only one bend is formed in the polarizer 340. However, the polarizer 340 may include a plurality of bends having the same angle or different angles.

As shown in FIG. 11B, the polarizer 340 of the present disclosure may be formed in a shape including one or a plurality of holes 342 having a curved shape or various shapes. As shown in FIG. 11C, the polarizer 340 of the present disclosure may be formed in a shape having one or a plurality of concave parts having a curved shape are formed at one side of the polarizer 340. However, the polarizer 340 of the present disclosure is not limited to the above-described shapes, and may be formed in various shapes.

Meanwhile, the present disclosure may be applied to not only the polarizer fabricated by the fabricating process of FIG. 4 but also the conventional polarizer. In the case of the conventional polarizer, an initial crack is generated in the lateral surface of the polarizing layer due to the cutting of the polarizer. When the polarizer is polished using the polishing roll shown in FIG. 9A so as to remove the initial crack, the size of the initial crack can be decreased. However, the size of a crack remaining in the lateral surface after the polishing may become about 40 µm or more according to polishing conditions, etc.

In the case of a PVA film, it is known that, if the PVA film is contracted and expanded due to heat or moisture when the size of an initial crack is 40 µm or more, the initial crack is propagated inward the PVA film due to applied stress. Therefore, in the case of the conventional polarizer, although a crack is decreased or removed by polishing the polarizer, the crack is propagated to the inside of the polarizer due to an initial crack, and therefore, the polarizer may be still damaged.

Accordingly, in the case of a polarizer having an initial crack with a size of 40 µm through the polishing, an adhesive may be disposed on lateral surfaces of the polarizer, such that the adhesive fills in the initial crack openings to firmly fix the initial cracks, thereby efficiently preventing the propagation of the initial crack.

In other words, the adhesive is disposed on the edges of the polarizer having various structures, which has an initial crack with a size of 40 µm, preferably, an initial crack with a size of 40 µm to 1.5 mm, thereby preventing the propagation of a crack.

Figure 12A:
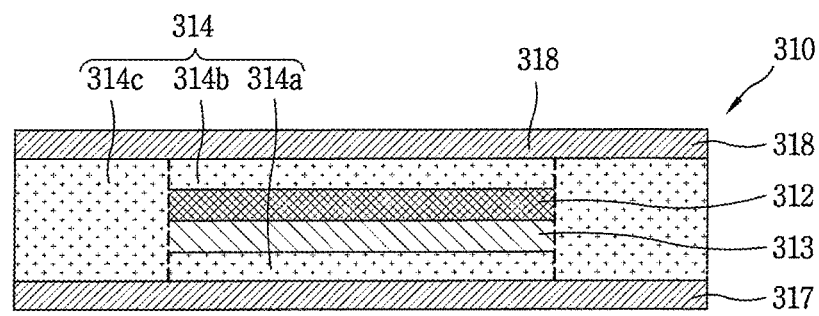
FIGS. 12A and 12B are views each illustrating a structure of a polarizer according to a second exemplary embodiment.
Figure 12B:
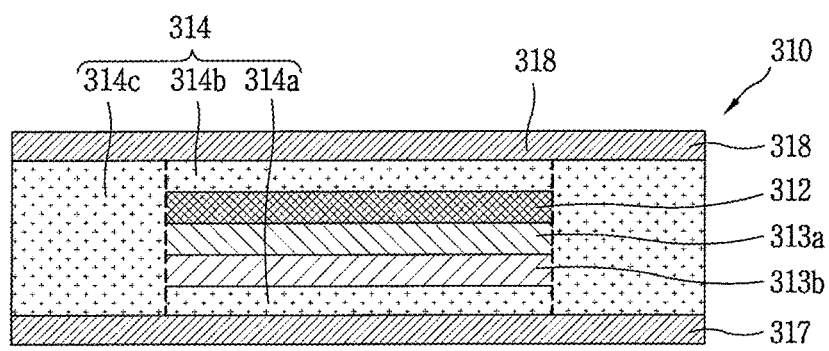

FIGS. 12A and 12B are views each illustrating a structure of a polarizer 310 according to a second exemplary embodiment.

As shown in FIG. 12A, the polarizer 310 of this exemplary embodiment includes a polarizing layer 312 having an optical axis formed in one axial direction to allow a light component in a set direction in incident light to be transmitted therethrough, a compensating layer 313 disposed on the bottom of the polarizing layer 312, an adhesive 314 applied onto each of top and lateral surfaces of the polarizing layer 312 and bottom and lateral surfaces of the compensating layer 313, and first and second protective films 317 and 318 respectively attached to a bottom surface of the polarizing layer compensating layer 313 and a top surface of the polarizing layer 312. Moreover, an adhesive may be applied between the compensating layer 313 and the polarizing layer 312 to secure the compensating layer 313 and the polarizing layer 312 together. When the compensating layer 313 includes one or more sub-layers (e.g., alignment layer, base film, quarter-wave plate (QWP), half-wave plate (HWP), and liquid crystals), an adhesive may be applied between the sub-layers to secure the layers together. The securing of the sub-layers of the compensating layer 313 and the polarizing layer 312 can be achieved by adhesive in other embodiments described herein.

In FIG. 12A, the compensating layer 313 is disposed below the polarizing layer 312 on a bottom surface of the polarizing layer 312. However, the compensating layer 313 may be disposed on above the polarizing layer 312 on a top surface of the polarizing layer 312, or may be disposed both below and above the polarizing layer 312 on both bottom and top surfaces of the polarizing layer 312. The compensating layer 313 may be disposed on one or both of the top and bottom of the polarizing layer 312. In addition, similar to the polarizing layer 312, an area of a surface of the compensating layer 313 parallel to the first or second surface of the polarizing layer 312 may be smaller than the area of the surface of the first protective film 317 parallel to the first surface and the area of the surface of the second protective film 318 parallel to the second surface of the polarizing layer 312.

The polarizing layer 312 is used to convert natural light into arbitrarily polarized light. The polarizing layer 312 may include a polymer material using, as a main component, a polyvinyl alcohol (PVA)-based resin containing iodine or dichroic pigments. Here, the iodine or dichroic pigment is uniaxially stretched to be aligned in one direction.

In addition, the polarizing layer 312 may include an O-type polarizer obtained by aligning a liquid crystalline composition containing a dichroic material and a liquid crystalline compound in a certain direction, an E-type polarizing material obtained by aligning lyotropic liquid crystals in a certain direction, and the like.

The compensating layer 313 changes the polarization direction of light polarized in the polarizing layer 312 or light incident into the polarizing layer 312.

For example, in the case of a liquid crystal display device, viewing angle characteristics are deteriorated when the liquid crystal display device is viewed in a diagonal direction. This is because, as the polarization directions of two polarizers respectively disposed on the top and bottom of the liquid crystal display device are not completely perpendicular to each other, and light polarized in the lower polarizer to be transmitted through a liquid crystal layer is not completely absorbed, and a portion of the light is leaked. Therefore, in order to improve the viewing angle characteristics when the liquid crystal display device is viewed in the diagonal direction, the entire light polarized in the lower polarizer needs to be absorbed by the upper polarizer. In the present disclosure, the compensating layer 313 is provided below, above, or below and above the polarizing layer 312. Also, the compensating layer 313 allows light incident on the upper polarizer to be at a perpendicular angle with the polarization direction of the upper polarizer by changing the polarization direction of the light transmitted through the liquid crystal layer of the liquid crystal display device, so that light is no longer leaked through the upper polarizer.

In the case of an organic light emitting display device, a polarizer is disposed on the organic light emitting display device to polarize light incident from the outside, so that light emitted from the organic light emitting display device is reduced. However, the polarized light is reflected to the outside, and therefore, visibility is reduced. In the present disclosure, the compensating layer 313 changes the polarization direction of light reflected from a surface of the organic light emitting display device, so that the reflected light is perpendicular to the polarization direction of the upper polarizer. Accordingly, light is no longer leaked through the upper polarizer, thereby improving visibility.

The compensating layer 313 may include various compensating materials capable of improving the viewing angle of light by changing the polarization direction of the light and compensating for a change in color corresponding to the viewing angle. For example, in the present disclosure, the compensating layer 313 may be an optical film formed in a film shape.

In the exemplary embodiment, the optical film may be a phase difference film having a quarter wave plate (QWP) retardation characteristic, which delays a phase of light by λ/4. Also, the optical film may be a compensating film such as a negative or positive A-compensating film, a negative or positive C-compensating film, or a negative or positive biaxial compensating film.

The phase difference film may include a cyclo-olefin polymer (hereinafter, referred to as COP). The COP is a polymer obtained from a cyclic monomer such as norbornene. The COP has advantages of excellent transparency, heat resistance, and chemical resistance, and very low birefringence and moisture absorption. However, the compensating layer 313 of the present disclosure is not limited to the COP, and may include various phase difference films made of cellulose acetate resin. However, the phase difference film constituting the compensating layer 313 is not limited to the COP, and may be made of various materials.

When the polarizer 310 having the compensating layer 313 configured as a phase difference film is applied to an organic light emitting display device, light linearly polarized in a first direction is converted into circularly polarized light by the polarizing layer compensating layer 313, and the circularly polarized light is reflected from a surface of the display device such that the polarization direction of the circularly polarized light is changed to the opposite direction. The circularly polarized light is again converted into a linearly polarized light (in a direction vertical to the polarizing layer 312) by the compensating layer 313. At this time, the direction of the optical axis of the polarizing layer 312 and the polarization direction of the incident light are vertical to each other, and thus the reflection of light on the surface of the organic light emitting display device can be prevented by the polarizing layer 312.

A stretched cyclo-olefin polymer film or a stretched polycarbonate film may be used as the negative or positive A-compensating film, and a biaxially stretched polymer film may be used as the negative or positive C-compensating film.

When the polarizer 310 having the compensating layer 313 configured as a compensating film is applied to an organic light emitting display device, the polarization direction of light reflected from a surface compensating layer becomes perpendicular to the direction of the optical axis (i.e., the transmission axis) of the polarizing layer 312 by the compensating layer 313, so that the polarizing layer 312 can prevent incident light from being reflected from a surface of the organic light emitting display device. In this exemplary embodiment, the compensating layer 313 may be made of an ultraviolet (UV) curable liquid crystal (LC) material used as a reactive mesogen (RM) material. The LC material is in a liquid phase, and includes a dopant that determines a twist angle of cured liquid crystal. The LC material is applied onto a base film on which an alignment layer aligned in a set direction is formed, and then cured by UV light, thereby forming a phase delay layer. The base film may substitute as the guide film in one or more embodiments described herein. In such embodiments, the thickness of the compensating layer 313 can be reduced due to removing the separate guide film during a manufacturing process of the polarizer.

The LC material is twisted by the dopant, and a retardation of a compensation layer is determined based on the thickness of the LC material, so that the polarization state of light is determined. In this exemplary embodiment, the thickness of the LC material is about 1.7 μm to 2.3 μm, preferably, 2 μm. The LC material may be a compensation layer having the QWP retardation characteristic.

In addition, the LC material may be a horizontally aligned negative or positive A-compensation layer, or may be a vertically aligned negative or positive C-compensation layer.

The adhesive 314 includes a first region 314a disposed on the bottom surface of the compensating layer 313 to attach the first protective film 317 to the bottom surface of the compensating layer 313, a second region 314b disposed on the top surface of the polarizing layer 312 to attach the second protective film 318 to the top surface of the polarizing layer 312, and a third region 314c disposed on lateral surfaces of the polarizing layer 312 and the compensating layer 313 to seal the lateral surfaces of the polarizing layer 312 and the compensating layer 313 and allow the first and second protective films 317 and 318 to be attached to each other at the periphery of the polarizing layer 312 and the compensating layer 313. Thus, the adhesive 314 covers one or more edges of the polarizing layer 312 and the compensating layer 313.

The adhesive 314 includes a hydrophobic acrylic material. However, the adhesive 314 includes an acrylic monomer containing a hydrophilic group so as to improve the adhesion with the polarizing layer 312 made of hydrophilic PVA.

As described above, in the present disclosure, a hydrophobic adhesive is used as the adhesive 314, and thus it is possible to prevent the penetration of moisture through the adhesive 314. When moisture penetrates into the polarizing layer 312 and the compensating layer 313, the polarization function of the polarizing layer 312 and the phase delay function of the compensating layer 313 are lowered. In addition, an initial crack generated in the polarizing layer 312 and/or the compensating layer 313 is propagated inwards of the polarizing layer 312 and/or the compensating layer 313 due to the expansion and contraction of the polarizing layer 312 and the compensating layer 313 caused by moisture or heat during a manufacturing process, and therefore, the polarizer 310 may be damaged. However, in the present disclosure, the adhesive 314 is made of a material having a hydrophobic characteristic, so that it is possible to prevent the penetration of moisture through the adhesive 314.

Furthermore, even when an initial crack is generated in the polarizing layer 312 and/or the compensating layer 313, the adhesive 314 fills the initial openings of the cracks in the compensating layer 313 and the polarizing layer 312. Thus, the initial cracks are firmly fixed by the adhesive 314, thereby preventing growth of the initial cracks. Moreover, similarly to the polarizing layer 312, the adhesive 314 may cover all edges of the compensating layer 313, or cover edges of the compensating layer 313 that cause cracks in the edges to propagate along a stretching direction of the compensating layer 313.

In the polarizer 310 having a structure shown in FIG. 12B, two compensating layers 313a and 313b are disposed below the polarizing layer 312 on the bottom surface of the polarizing layer 312. In this structure, the compensating layers 313a and 313b may be disposed above the polarizing layer 312 on a top surface of the polarizing layer 312, or may be respectively disposed above and below the polarizing layer 312, according to the kind of a display device to which the polarizing layer 310 is applied and optical characteristics of the compensating layers 313a and 313b. The area of the surface of the compensating layers 313a and 313b parallel to the first surface of the polarizing layer 312 may be smaller than an area of the surface of the first protective film 317 parallel to the first surface and an area of the surface of the second protective film 318 parallel to the second surface. Moreover, an adhesive may be applied between the compensating layers 313a, 313b, and the polarizing layer 312 to secure the compensating layers 313a, 313b, and the polarizing layer 312 together.

In this case, a first compensating layer 313a may be configured as a phase difference film that delays a phase of light by λ/4, and a second compensating layer 313b may be configured as a half wave plate (HWP) phase difference film, which delays a phase of light by λ/2. The phase difference film may be made of the COP, the first compensating layer 313a may be formed to have a thickness of 32 μm to 36 μm, preferably, 34 μm, and the second compensating layer 313b may be formed to have a thickness of 31 μm to 35 μm, preferably, 34 μm.

As described above, the first compensating layer 313a configured as a QWP prevents light reflection by converting linearly polarized light into circularly polarized light. However, in the first compensating layer 313a configured as the QWP, light in a wavelength band of about 550 nm is smoothly converted into circularly polarized light, and light outside this wavelength band may not be completely converted into circularly polarized light. In the first compensating layer 313a configured as the QWP, light is not completely blocked and may be leaked in a direction viewed from the top/bottom/left/right of the front of a screen.

Meanwhile, the second compensating layer 313b configured as the HWP changes the direction of incident linearly polarized light to a direction perpendicular thereto. Thus, when the polarizer 310 includes both of the first and second compensating layers 313a and 313b and is applied to an organic light emitting display device, it is possible to prevent light in all wavelength bands from being reflected from a surface of the organic light emitting display device. In addition, it is possible to enhance image quality when viewed from various inclined angles.

Each of the first and second compensating layers 313a and 313b may be configured as a compensating film. For example, the first compensating layer 313a may be any one compensating film among a negative or positive A-compensating film, a negative or positive C-compensating film, and a negative or positive biaxial compensating film, and the second compensating layer 313b may also be any one compensating film among a negative or positive A-compensating film, a negative or positive C-compensating film, and a negative or positive biaxial compensating film. At this time, the horizontal direction phase difference value and/or vertical direction phase difference value of the compensating film constituting each of the first and second compensating layer 313a or 313b is adjusted, so that it is possible to completely prevent leakage of light in a diagonal direction (e.g., in a liquid crystal display device) or reflection of light (e.g., in an organic light emitting display device).

In addition, each of the first and second compensating layer 313a or 313b may be made of a liquid crystal material having QWP and HWP retardation characteristics. Each of the first and second compensating layer 313a or 313b may be formed to have a thickness of 1.7 μm to 2.3 μm, preferably, 2 μm. At this time, the first compensating layer 313a is a QWP compensation layer, and the second compensating layer 313b is an HWP compensation layer. The liquid crystal material constituting each of the first and second compensating layer 313a or 313b may be formed to have a thickness of 2 μm or less.

In addition, the first compensating layer 313a may be configured as a retardation layer, and the second compensating layer 313b may be configured as an optical compensation layer. For example, the first compensating layer 313a may be made of a liquid crystal material having a reverse dispersion QWP retardation characteristic, and the second compensating layer 313b may be made of a liquid crystal material having a vertically aligned negative or positive C-compensation characteristic. In this case, each of the first and second compensating layers 313a and 313b may be formed to have a thickness of 1.7 μm to 2.3 μm, preferably, 2 μm.

It will be apparent that the first compensating layer 313a may be made of a regular dispersion retardation material and the second compensating layer 313b may be made of another compensation material such as an A-compensation material or B-compensation material.

In the polarizer 310 having the above-described structure, the adhesive 314 includes an acrylic monomer containing a hydrophilic group, so that it is possible to improve the adhesion of the first and second protective films 317 and 318 and to prevent the penetration of moisture through the adhesive 314.

Figure 13:
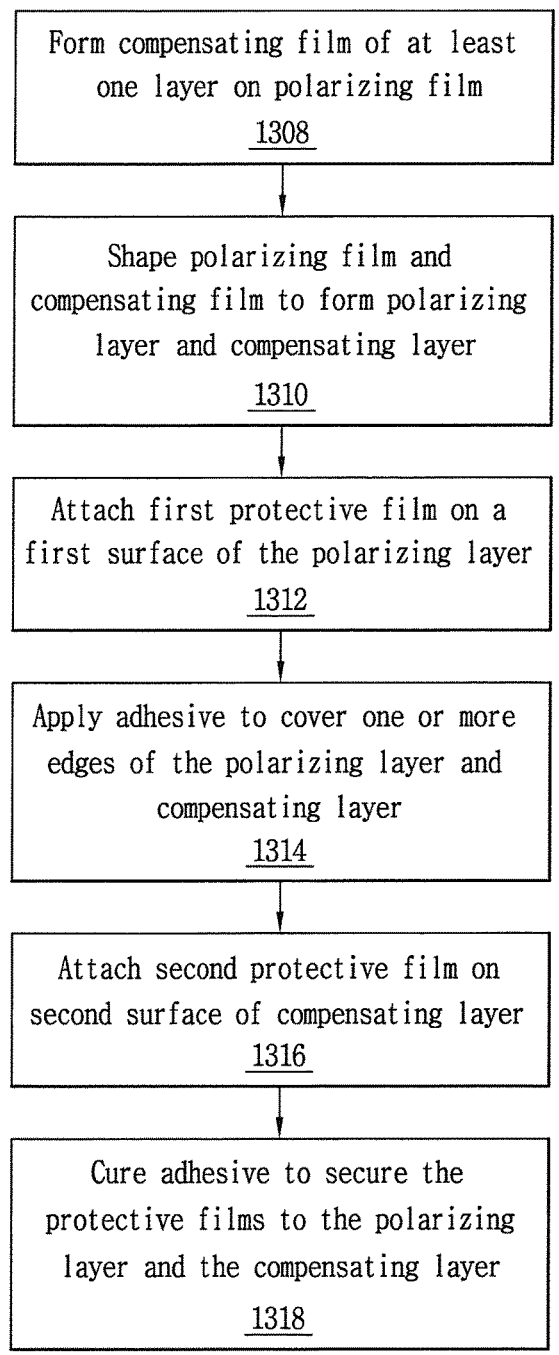
FIG. 13 is a view illustrating a method of fabricating the polarizer according to the second exemplary embodiment.
Figure 14:
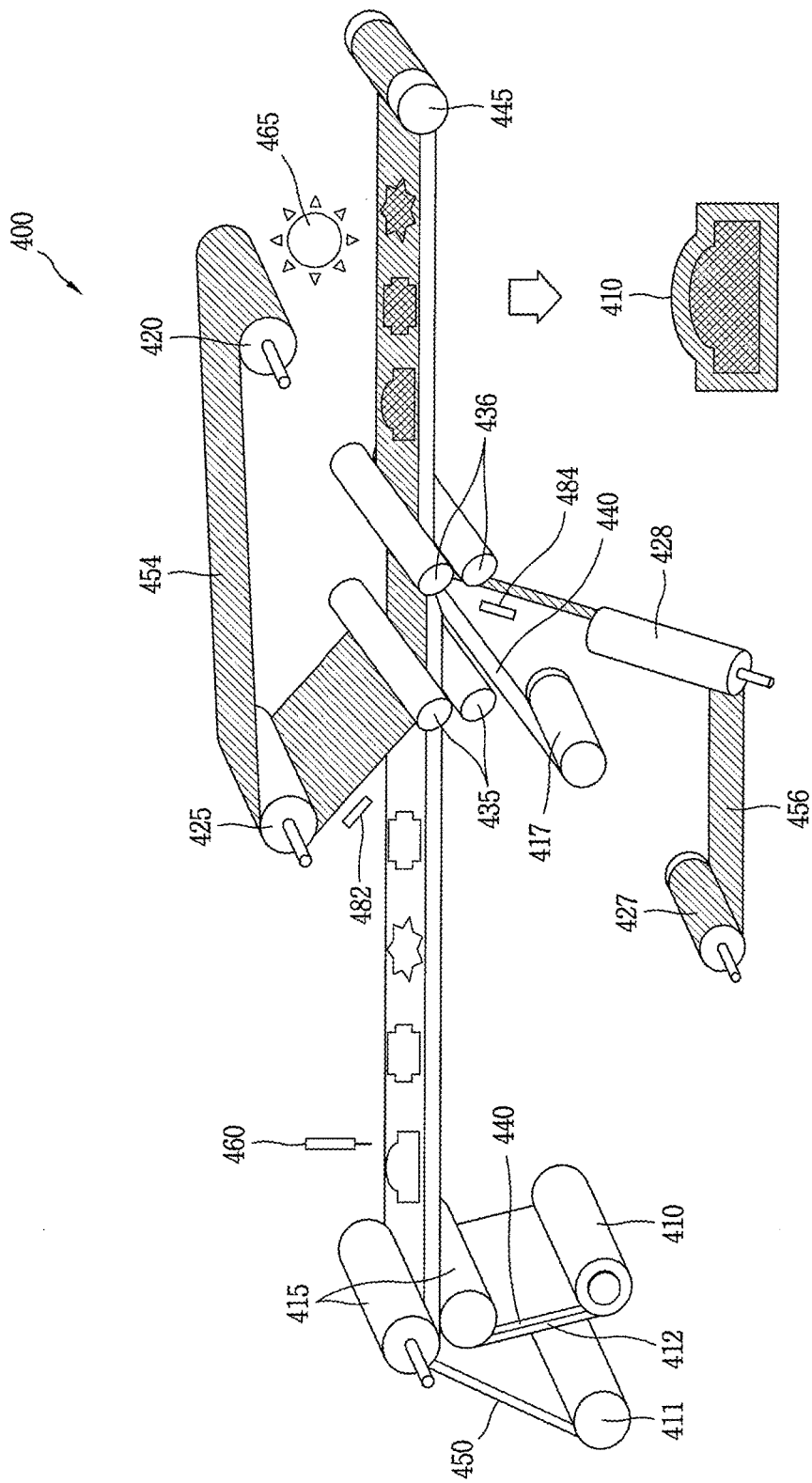
FIG. 14 is a view illustrating an apparatus for fabricating the polarizer according to the second exemplary embodiment.

FIG. 13 is a view illustrating a method of fabricating the polarizer 310 according to the second exemplary embodiment. FIG. 14 is a view illustrating an apparatus for fabricating the polarizer 310 according to the second exemplary embodiment. Here, the method and the apparatus of FIGS. 13 and 14 relate to a method and an apparatus when a compensating film (or phase difference film) formed in a film shape is used. In addition, the polarizer 310 may be provided with one compensating layer (structure of FIG. 12A) or two compensating layers (structure of FIG. 12B). However, only a case where one compensating layer is provided will be described below. If the same process and apparatus as the one compensating layer are used when two compensating layers are provided, only the number of compensating layers to be attached or processed will be merely changed.

As shown in FIG. 14, the apparatus 400 includes a first supply roll 410 that supplies a guide film 440 to which a compensating film 412 is attached, a second supply roll 411 that supplies a stretched PVA film 450, a first attaching roll 415 that attaches the PVA film 450 to the guide film 440 and the compensating film 412, which are attached to each other, a processing device 460 that processes the PVA film 450 and the compensating film 412, third and fourth supply rolls 420 and 427 that respectively supply first and second protective films 454 and 456 configured as acrylic films, first and second guide rolls 425 and 428 that respectively guide the first and second protective films 454 and 456, a second attaching roll 435 that attaches the first protective film 454 to the PVA film 450 and the compensating film 412, a third attaching roll 436 that attaches the second protective film 456 to the PVA film 450 and the compensating film 412, first and second adhesive supply units 482 and 484 that supply an adhesive to the respective second and third attaching rolls 435 and 436, a separating roll 417 that separates the guide film 440, a curing device 465 that cures the adhesive applied onto the PVA film 450 and the compensating film 412 to attach the first and second protective films 454 and 456 to the PVA film 450 and the compensating film 412, and a third guide roll 445 that guides the PVA film 450 and the compensating film 412, to which the first and second protective films 454 and 456 are attached.

Although not shown in FIG. 14, an attaching roll that attaches the compensating film 412 to the guide film 440 is provided at the front end of the first supply roll 410.

As shown in FIG. 13, in the apparatus 400 having the above-described structure, a compensating film is formed 1308 on a PVA film 250. The PVA film 250 and the compensating film is shaped 1310 to form one or more polarizing layers and compensating layers. The first protective film is attached 1312 on a first surface of the polarizing layer. An area of a surface of the first protective film parallel to the first surface is larger than an area of the first surface of the polarizing layer. The adhesive is applied 1314 on the polarizing layer and the compensating layer to cover one or more edges of the polarizing layer and the compensating layer. The second protective film is attached 1316 to a second surface of the compensating layer. An area of a surface of the second protective film parallel to the second surface is larger than an area of a surface of the compensating layer parallel to the first surface. The adhesive is cured 1318 to secure the protective films to the polarizing layer.

The attachment of the compensating film 412 and the guide film 440 and the attachment of the PVA film 450 and the guide film 440 having the compensating film 412 may be performed using a separate adhesive means, or may be respectively performed by a van der Waales force between the compensating film 412 and the guide film 440 and a van der Waales force between the PVA film 450 and the guide film 440 without any separate adhesive means.

In the above, it has been described that, after the compensating film 412 is attached to the guide film 440, the PVA film 450 is attached to the compensating film 412 and the guide film 440. However, in other embodiments, the compensating film 412 and the PVA film 450 may first be attached to each other, and the compensating film 442 and the PVA film 450, which are attached to each other, may then be attached to the guide film 440.

After that, the PVA film 450 and the compensating film 412, which are attached to the guide film 440, is processed using the processing device 460 such as a laser. At this time, the processing device 460 processes only the PVA film 450 and the compensating film 412 and does not process the guide film 440. Therefore, a plurality of processed PVA films 450 and compensating films 412 exist on a top surface of the guide film 440. A mechanical cutting tool may be used as the processing device 460, but the laser may be more preferably used as the processing device 460 in that the laser does not apply mechanical impact to the PVA film 450. The processing of the PVA film 450 and the compensating film 412 is changed depending on the shape of a display device to which a fabricated polarizer is applied. For example, when the display device has a square or rectangular shape, the polarizer provided in the display device is also formed in a square or rectangular shape, and therefore, the PVA film 450 and the compensating film 412 are also formed in a square or rectangular shape. In addition, when the display device has a specific shape such as a polygonal shape having a plurality of bends, a circular shape, or an elliptical shape, the processed PVA film 450 and the processed compensating film 412 are also formed in a corresponding shape such as a polygonal shape having bends, a circular shape, or an elliptical shape.

Since the adhesive is disposed at the lateral surfaces of the polarizing layer, the PVA film 450 and the compensating film 412 are shaped to have an area smaller than that of the fabricated polarizer.

Subsequently, the first and second protective films 454 and 456 are supplied using the third and fourth supply rolls 420 and 427. Then, the first and second protective films 454 and 456 are respectively attached to top and bottom surfaces of the PVA film 450 and the compensating films 412 using the second and third attaching rolls 435 and 436. At this time, the first and second adhesive supply units 482 and 484 are respectively provided in the vicinity of the second and third attaching rolls 435 and 436 to apply the adhesive to the top and bottom surfaces of the PVA film 450 and the compensating film 412, so that the first and second protective films 454 and 456 are respectively attached to the top and bottom surfaces of the PVA film 450 and the compensating film 412. For example, the adhesive may be applied to a top surface of the PVA film by the first adhesive supply unit 482, and the adhesive may be applied to a bottom surface of the compensating film 412 by the second adhesive supply unit 484.

In between applying the adhesives, the guide film 440 is separated from the PVA film 450 and the compensating film 412 using the separating roll 417. For example, the guide film 440 may be detached from the PVA film 450 and the compensating film 412 after the first protective film 454 is attached to a top surface of the PVA film 450. Alternatively, the guide film 440 may be separated and simultaneously, the adhesive may be applied to the top and bottom surfaces of the PVA film 450.

The PVA film 450 and the compensating film 412 are processed into a plurality of shaped films, and the first and second protective films 454 and 456 are formed having a width similar to that of the second and third attaching rolls 435 and 436. Thus, the first and second protective films 454 and 456 are respectively attached to the top and bottom surfaces of the PVA film 450 and the compensating film 442. In addition, the first and second protective films 454 and 456 are attached to each other. Specifically, the adhesive is disposed to cover one or more edges of the PVA film 450 and the compensating film 442.

After that, the adhesive between the PVA film 450 and the compensating film 442, and the first and second protective films 454 and 456 is cured using the curing device 465). The plurality of shaped PVA films 450 and compensating films 412, which are attached to each other, and the first and second protective films 454 and 456 are processed, thereby completing a plurality of polarizers. At this time, the cutting of the PVA film 450 and the compensating film 412, and the first and second protective films 454 and 456 is performed along the shape of the processed PVA film 450 and the compensating film 412. In this case, the cutting of the PVA film 450 and the compensating film 412, and the first and second protective films 454 and 456 is performed such that boundaries of the first and second protective films 454 and 456 extend beyond boundaries of the shaped PVA film 450 and the compensating film 412 by a certain distance (e.g., 1 μm to 1.5 mm).

Figure 15:
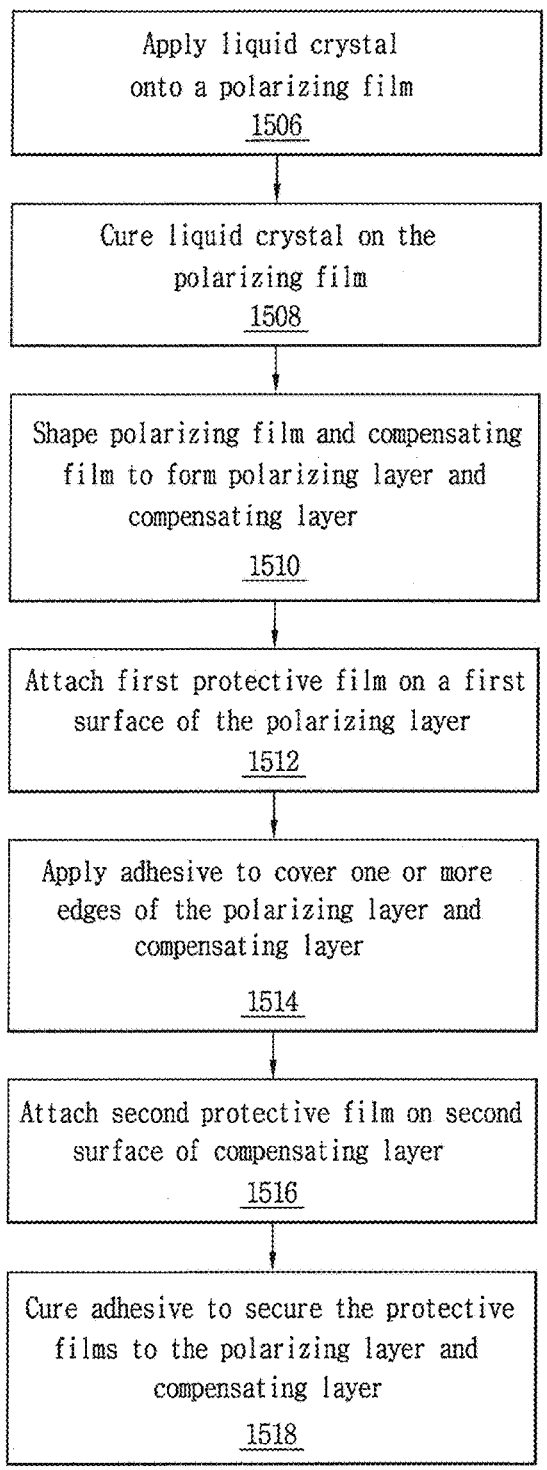
FIG. 15 is a view illustrating another method of fabricating the polarizer according to the second exemplary embodiment.
Figure 16:
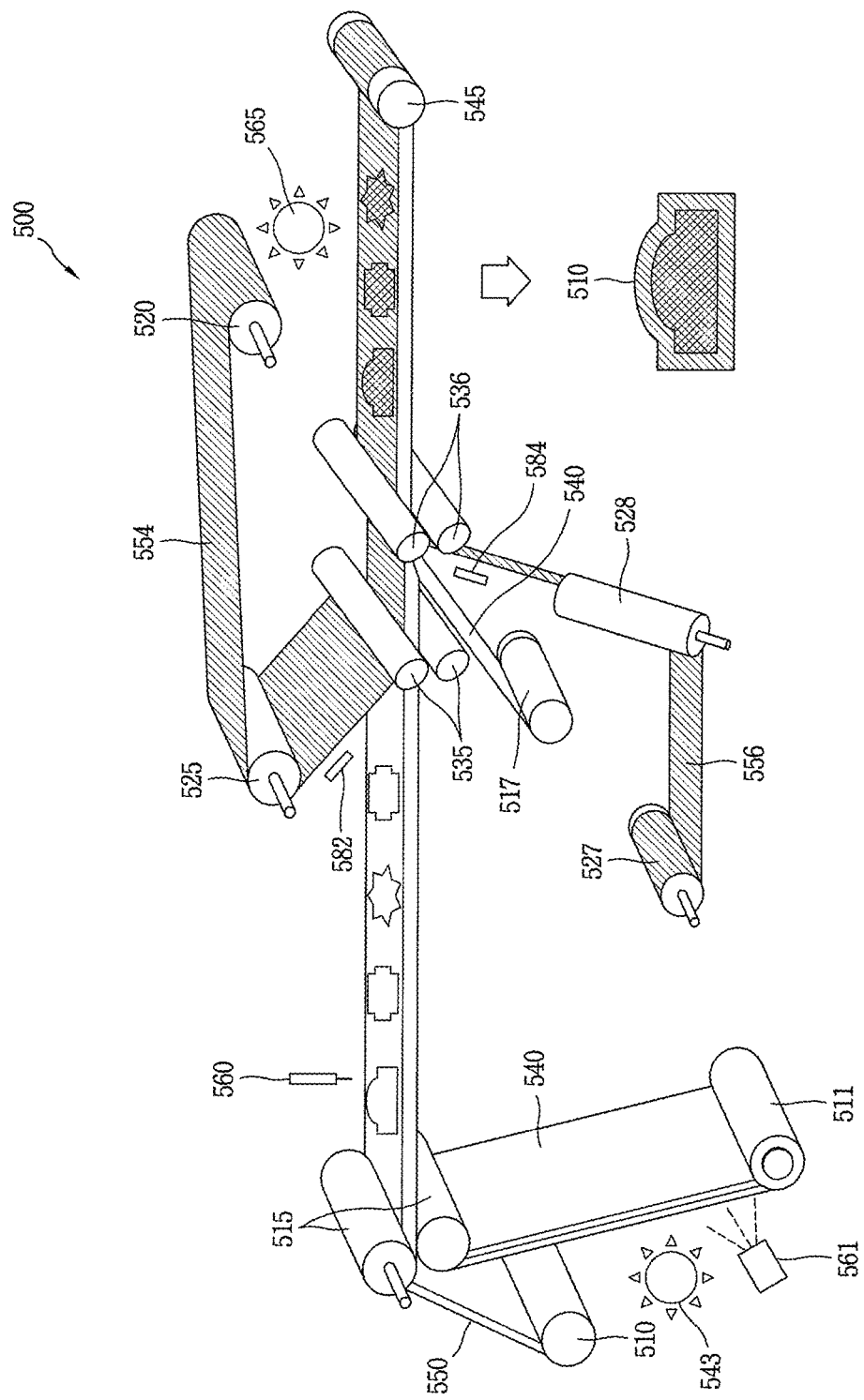
FIG. 16 is a view illustrating another apparatus for fabricating the polarizer according to the second exemplary embodiment.

FIG. 15 is a view illustrating another method of fabricating the polarizer 310 according to the second exemplary embodiment. FIG. 16 is a view illustrating another apparatus for fabricating the polarizer 310 according to the second exemplary embodiment. Particularly, FIGS. 15 and 16 are views illustrating a method and an apparatus when a liquid crystal material is used as a compensation layer.

As shown in FIG. 16, the apparatus 500 includes a first supply roll 510 that supplies a stretched PVA film 550, a second supply roll 511 that supplies a guide film 540 on which an alignment layer is formed, an applicator 561 that applies a curable liquid crystal material onto the alignment layer on the guide film 540, a first curing device 543 that cures the liquid crystal material applied onto the guide film 540, a first attaching roll 515 that attaches the PVA film 550 to the guide film 540 such that a liquid crystal layer is transferred to the PVA film 550, a processing device 560 that processes the PVA film 550 having the transferred liquid crystal layer, third and fourth supply rolls 520 and 527 that respectively supply first and second protective films 554 and 556 made of an acrylic film, first and second guide rolls 525 and 528 that respectively guide the first and second protective films 554 and 556, a second attaching roll 535 that attaches the first protective film 554 to the PVA film 550, a third attaching roll 536 that attaches the second protective film 556 to the PVA film 550, first and second adhesive supply units 582 and 584 that apply an adhesive to the respective second and third attaching rolls 535 and 536, a separating roll 517 that separates the guide film 540 from the PVA film 550, a second curing device 565 that cures the adhesive applied onto the PVA film 550 to attach the first and second protective films 554 and 556 to the PVA film 550, and a third guide roll 545 that guides the PVA film 550 to which the first and second protective films 554 and 556 are attached.

Although not shown in FIG. 16, a device for applying and curing an alignment layer on the guide film 540 and a device such as a rubbing device for determining an alignment direction of the cured alignment layer may be installed at the front end of the second supply roll 511.

An ultraviolet curing device may be used as the first curing device for curing the liquid crystal material and the second curing device for curing the adhesive. In this case, the wavelength of ultraviolet light irradiated from the first curing device and the wavelength of ultraviolet light irradiated from the second curing device are set different from each other.

As shown in FIG. 15, liquid crystal is applied 1506 to a PVA film 250. The liquid crystal is cured 1508 to form a compensating film. The liquid crystal layer may be cured by a first wavelength range of UV light. The PVA film 250 and the compensating film is shaped 1510 to form one or more polarizing layers and compensating layers. The first protective film is attached 1512 on a first surface of the polarizing layer. An area of a surface of the first protective film parallel to the first surface is larger than an area of the first surface of the polarizing layer. The adhesive is applied 1514 on the polarizing layer and the compensating layer to cover one or more edges of the polarizing layer and the compensating layer. The second protective film is attached 1516 to a second surface of the compensating layer. An area of a surface of the second protective film parallel to the second surface is larger than an area of a surface of the compensating layer parallel to the first surface. The adhesive is cured 1518 to secure the protective films to the polarizing layer. The adhesive may be cured by a second wavelength rage of UV light different from the first wavelength range.

In this case, the liquid crystal layer may be formed in a single layer having a QWP retardation characteristic. The liquid crystal layer may be formed in a plurality of layers having QWP and HWP retardation characteristics or a plurality of layers having a QWP retardation characteristic and a positive C-compensation characteristic. The ultraviolet (UV) light irradiated from the first curing device 543 is ultraviolet light having a wavelength of about 365 nm.

Although not shown in FIG. 16, an alignment layer with an alignment direction determined in a specific direction is formed on the guide film 540. When the liquid crystal material is applied onto the alignment layer, liquid crystal molecules of the liquid crystal material are arranged along the alignment direction of the alignment layer, so that optical characteristics of the liquid crystal layer are determined.

After that, the PVA film 550 is stretched, and the stretched PVA film is then attached to the guide film 540 on which the liquid crystal layer is formed. Through the attachment, the liquid crystal layer on the guide film 540 is transferred to the PVA film 550. Subsequently, the PVA film 550 attached to the guide film 540 is processed using the processing device 560 such as a laser. At this time, only the PVA film 550 and the liquid crystal layer transferred to the PVA film 550 are processed, and the guide film 540 is not processed. Therefore, only the PVA film 550 and the liquid crystal layer formed in at least one layer exist on a top surface of the guide film 540.

The processing of the PVA film 550 and the liquid crystal layer is changed depending on the shape of a display device to which a fabricated polarizer is applied. For example, when the display device has a square or rectangular shape, the polarizer provided in the display device is also formed in a square or rectangular shape, and therefore, the PVA film 550 and the liquid crystal layer are also formed in a square or rectangular shape. In addition, when the display device has a specific shape such as a polygonal shape having bends, a circular shape, or an elliptical shape, the processed PVA film 550 and the liquid crystal layer are also formed in a corresponding shape such as a polygonal shape having bends, a circular shape, or an elliptical shape.

Since the adhesive is disposed to cover one or more edges of the polarizing layer and the compensating layer, the PVA film 550 and the liquid crystal layer are processed to have an area smaller than that of the fabricated polarizer.

After that, the first and second protective films 554 and 556 are respectively attached to top and bottom surfaces of the PVA film 550 and the liquid crystal layer, and the guide film 540 is separated. For example, the adhesive may be applied to a top surface of the PVA film by the first adhesive supply unit 582, and the adhesive may be applied to a bottom surface of the liquid crystal layer by the second adhesive supply unit 584. The guide film 540 may be detached from the PVA film 550 and the liquid crystal layer after the first protective film 554 is attached to a top surface of the processed PVA film 550 and liquid crystal layer. Alternatively, the guide film 540 may be separated and simultaneously, the adhesive may be applied to the top and bottom surfaces of the PVA film 550.

Subsequently, ultraviolet light is irradiated from the second curing device 565 to cure the adhesive between the first and second protective films 554 and 556 and the PVA film 550 and the liquid crystal layer, which are attached to each other. The first and second protective films 554 and 556 are processed and shaped such that boundaries of the first and second protective films 554 and 556 extend beyond boundaries of the shaped PVA films 550 and liquid crystal layers by a certain distance, thereby completing a plurality of polarizers.

The adhesive is cured by irradiating ultraviolet light having a wavelength of about 313 nm. At this time, the wavelength (about 313 nm) of the ultraviolet light for curing the adhesive and the wavelength (about 365 nm) of the ultraviolet light for curing the liquid crystal material are different from each other. Thus, it is possible to prevent characteristics of the previously cured liquid crystal layer from being changed by the ultraviolet light irradiated when the adhesive is cured.

Figure 17A:
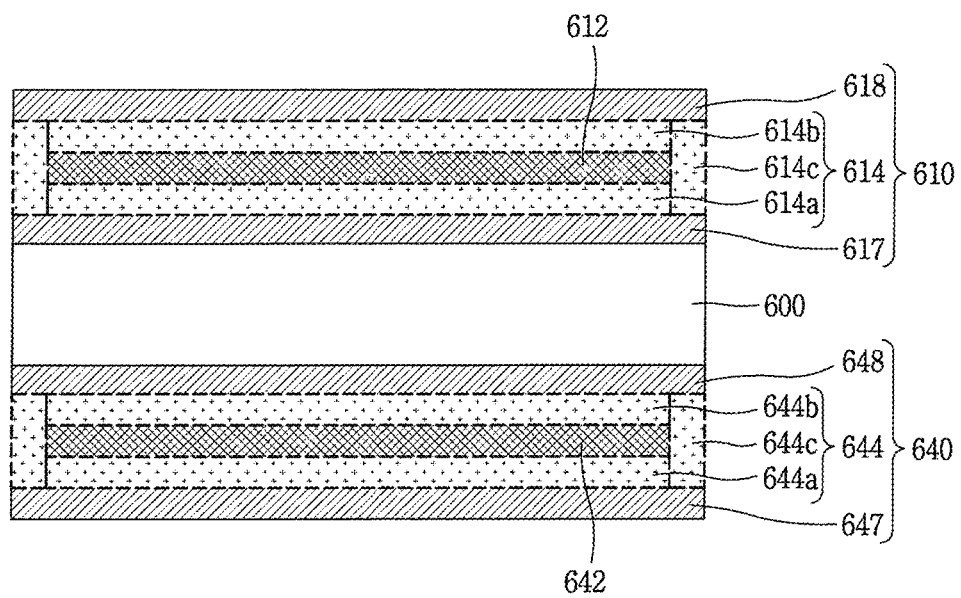
FIGS. 17A to 17C are views illustrating structures of a display device according to the present disclosure.
Figure 17B:
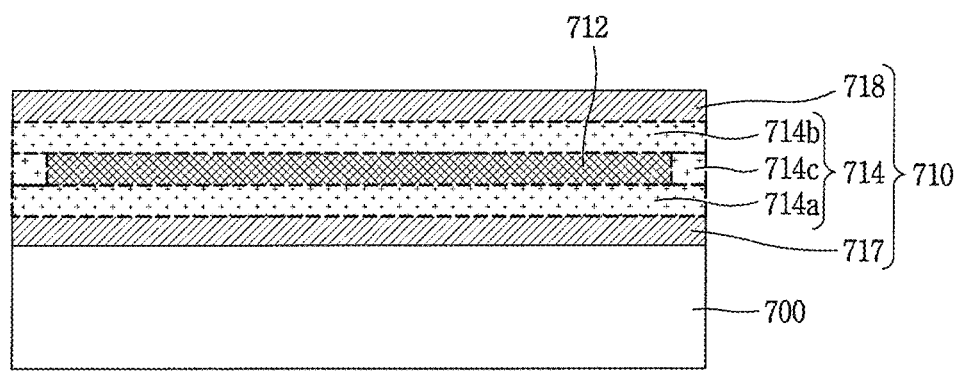
Figure 17C:
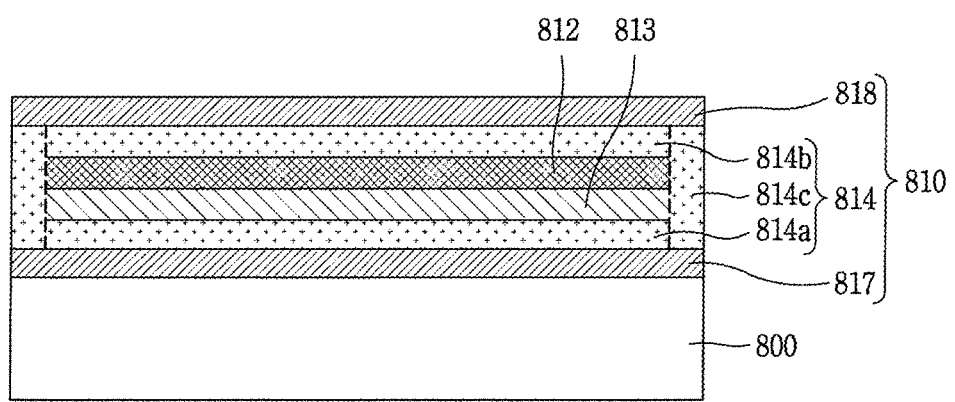

FIGS. 17A to 17C are views illustrating structures of a display device according to the present disclosure.

As shown in FIG. 17A, the display device according to the present disclosure includes a display panel 600 and first and second polarizers 610 and 640 respectively attached to top and bottom surfaces of the display panel 600.

The display panel 600 is a liquid crystal panel. Although not shown in FIG. 17A, the liquid crystal panel 600 includes a first substrate, a second substrate, and a liquid crystal layer disposed between the first and second substrates. The first and second substrates are made of a material, such as glass or plastic, which is transparent and flat and has smooth top and bottom surfaces. A plurality of gate lines and a plurality of data lines, which are arranged laterally and longitudinally to define a plurality of pixel regions, are formed on the first substrate. A thin film transistor is formed as a switching element in each pixel region, and a pixel electrode is formed on the pixel region. In addition, the thin film transistor includes a gate electrode connected to a gate line, a semiconductor layer formed as amorphous silicon, etc. is stacked on the gate electrode, and source and drain electrodes formed on the semiconductor layer, the source and drain electrodes being connected to a data line and the pixel electrode.

The second substrate includes a color filter configured with a plurality of sub-color filters that implement colors of red (R), green (G), and blue (B), and a black matrix that defines between the sub-color filters and blocks light transmitted through the liquid crystal layer.

The first and second substrates configured as described above are attached by a sealant formed at the periphery thereof to be opposite to each other with the liquid crystal layer interposed therebetween, thereby constituting the liquid crystal panel. The attachment of the first and second substrates is performed through an attachment key formed on the first or second substrate.

The first polarizer 610 includes a first polarizing layer 612 having an optical axis formed in one axial direction to allow only a light component in a set direction in incident light to be transmitted therethrough, and first and second protective films 617 and 618 respectively attached to bottom and top surfaces of the first polarizing layer 612 by a first adhesive 614.

Here, the first adhesive 614 includes first and second regions 614*a* and 614*b* respectively disposed on the bottom and top surfaces of the first polarizing layer 612, and a third region 614*c* disposed on a side section of the first polarizing layer 612 to seal the lateral surfaces of the first polarizing layer 612 and to allow the first and second protective films 617 and 618 to be attached to each other.

In addition, the second polarizer 640 includes a second polarizing layer 642 and third and fourth protective films 647 and 648 respectively attached to bottom and top surfaces of the second polarizing layer 642 by a second adhesive 644.

Here, the second adhesive 644 includes first and second regions 644*a* and 644*b* respectively disposed on the bottom and top surfaces of the second polarizing layer 642, and a third region 644*c* disposed on a side section of the second polarizing layer 642 to seal the lateral surfaces of the second polarizing layer 642 and to allow the third and fourth protective films 647 and 648 to be attached to each other.

Each of the first and second polarizing layers 612 and 642 is a film capable of converting natural light into arbitrarily polarized light. Each of the first and second polarizing layers 612 and 642 may include a polymer material using, as a main component, a polyvinyl alcohol (PVA)-based resin containing iodine or dichroic pigment. However, each of the first and second polarizing layers 612 and 642 may include an O-type polarizer obtained by aligning a liquid crystalline composition containing a dichroic material and a liquid crystalline compound in a certain direction, an E-type polarizing material obtained by aligning lyotropic liquid crystals in a certain direction, and the like.

The first to fourth protective films 617, 618, 647, and 648 may include triacetyl cellulose (TAC), polyethylene terephthalate (PET), cyclo-olefin polymer (COP), or a combination thereof. However, the first to fourth protective films 617, 618, 647, and 648 may be formed of an acrylic material having a hydrophobic characteristic so as to prevent the penetration of moisture from the outside.

In order to prevent the penetration of moisture from the outside, the first and second adhesives 614 and 644 may include an acrylic adhesive material containing an acrylic monomer having a hydrophilic characteristic, a radical polymerization initiator, an epoxy resin, an iodine initiator that is a cationic photopolymerization initiator, and a photosensitizer. In order to improve the adhesion with PVA, the first and second adhesives 6114 and 644 may contain one or more kinds of hydrophilic groups.

Each of the first and second adhesives 614 and 644 may be formed in one adhesive layer or may be formed in two adhesive layers as shown in FIGS. 2A and 2B. In addition, as shown in FIG. 3, each of the first and second adhesives 614 and 644 may include an adhesive layer on the top surface of the polarizing layer, an adhesive layer on the bottom surface of the polarizing layer, and an adhesive layer on the side section of the polarizing layer covering one or more edges of the polarizing layers 612 and 642.

In the display device having the above-described structure, the first and second polarizers 610 and 640 are respectively attached to the top and bottom surfaces of the liquid crystal panel 600, and the optical axes of the first and second polarizers 610 and 640 are formed in parallel or perpendicularly to each other. Thus, the transmittance of light input to the liquid crystal panel 600 from an external backlight and the transmittance of light output from the liquid crystal panel 600 are adjusted, thereby implementing an image.

Meanwhile, in the display device according to the present disclosure, the first and second polarizing layers 612 and 642 of the first and second polarizers 610 and 640 are not exposed to the outside but sealed by the third region 614c of the first adhesive 614 and the third region 644c of the second adhesive 644, so that it is possible to prevent external moisture from penetrating into the polarizers 610 and 640. In addition, it is possible to prevent the generation of initial cracks in the polarizing layers 612 and 642 or the propagation of the initial cracks.

Accordingly, it is possible to prevent the polarizers 610 and 640 from being damaged due to the penetration of moisture and the generation of cracks. Since a polishing process for removing initial cracks is not required, the number of fabricating processes can be decreased, and fabricating cost can be reduced. In addition, it is possible to fabricate polarizers having various shapes, on which polishing using s polishing roll cannot be performed.

As shown in FIG. 17B, the display device according to the present disclosure may include a display panel 700 and a polarizer 710 attached to a top surface of the display panel 700.

The display panel 700 is an organic light emitting display panel. Although not shown in FIG. 17B, the organic light emitting display panel 700 includes a first substrate, a second substrate, an organic light emitting layer disposed between the first and second substrates. The first and second substrates are made of a material, such as glass or plastic, which is transparent and flat and has smooth top and bottom surfaces. A plurality of gate lines and a plurality of data lines, which are arranged laterally and longitudinally to define a plurality of pixel regions, are formed on the first substrate. A thin film transistor is formed as a switching element in each pixel region, and a pixel electrode is formed on the pixel region. In addition, the thin film transistor includes a gate electrode connected to a gate line, a semiconductor layer formed as amorphous silicon, etc. stacked on the gate electrode, and source and drain electrodes formed on the semiconductor layer, the source and drain electrodes being connected to a data line and the pixel electrode.

The first and second substrates configured as described above have an organic light emitting layer provided therebetween. Thus, as a signal is applied, light is emitted from the organic light emitting layer, thereby implementing an image.

The polarizer 710 includes a polarizing layer 712 having an optical axis formed in one axial direction to allow only a light component in a set direction in incident light to be transmitted therethrough, and first and second protective films 717 and 718 respectively attached to bottom and top surfaces of the polarizing layer 712 by an adhesive 714.

Here, the adhesive 714 includes first and second regions 714a and 714b respectively disposed on the bottom and top surfaces of the polarizing layer 712, and a third region 714c disposed on a side section of the polarizing layer 712 to seal one or more edges of the polarizing layer 712 and to allow the first and second protective films 717 and 718 to be attached to each other.

The polarizing layer 712 includes a polymer film using, as a main component, a polyvinyl alcohol (PVA)-based resin, and the protective films 717 and 718 include an acrylic material having a hydrophobic characteristic. The adhesive 714 includes an acrylic material having a hydrophilic group.

In the display device having the above-described structure, the polarizer 710 is attached to the top surface of the organic light emitting display panel 700, to allow light emitted from the organic light emitting layer to be transmitted therethrough and block light incident from the outside in the implementation of an image, thereby improving the visibility of the organic light emitting display device.

At this time, the polarizing layer 712 is sealed by the adhesive, so that it is possible to prevent external moisture from penetrating into the polarizing layer 710. In addition, it is possible to prevent the generation of an initial crack in the polarizing layer 712 or the penetration of the initial crack. Accordingly, it is possible to prevent the polarizer 710 from being damaged due to the penetration of moisture and the generation of cracks. Since a polishing process for removing initial cracks is not required, the number of fabricating processes can be decreased, and fabricating cost can be reduced. In addition, it is possible to fabricate polarizers having various shapes, on which polishing using s polishing roll cannot be performed.

As shown in FIG. 17C, the display device according to the present disclosure may include a display panel 800 and a polarizer 810 attached to a top surface of the display panel 800. The display panel 800 is an organic light emitting display panel. The display panel 800 has the same structure as the display panel 700 shown in FIG. 17B.

The polarizer 810 includes a polarizing layer 812 having an optical axis formed in one axial direction to allow only a light component in a set direction in incident light to be transmitted therethrough, a compensating layer 813 disposed on a bottom surface of the polarizing layer 812, and first and second protective films 817 and 818 respectively attached to a bottom surface of the compensating layer 813 and a top surface of the polarizing layer 812 by an adhesive 814.

The compensating layer 813 may be configured with a single film or a plurality of films. The compensating layer 813 may be formed in a single layer or a plurality of layers. The compensating layer 813, as shown in FIGS. 12A and 12B, may be a phase difference film or compensating film having a QWP retardation characteristic, or may be a plurality of phase difference films or a plurality of compensating films, which have QWP and HWP retardation characteristics. In addition, the compensating layer 813 may be a liquid crystal layer having a QWP retardation characteristic, or may be a plurality of liquid crystal layers having QWP retardation characteristics. The compensating layer 713 may be a liquid crystal layer having a QWP retardation characteristic or a compensation layer such as a negative or positive C-compensation layer.

The adhesive 814 includes first and second regions 814a and 814b respectively disposed on the bottom and top surfaces of the polarizing layer 812, and a third region 814c disposed on a side section of the polarizing layer 812 to seal one or more edges of the polarizing layer 812 and the compensating layer 813 and to allow the first and second protective films 817 and 818 to be attached to each other.

The polarizing layer 812 includes a polymer film using, as a main component, a polyvinyl alcohol (PVA)-based resin, and the protective films 817 and 818 include an acrylic material having a hydrophobic characteristic. The adhesive 814 includes an acrylic material having a hydrophilic group.

In the display device having the above-described structure, the polarizer 810 is attached to the top surface of the organic light emitting display panel 800, to allow light emitted from the organic light emitting layer to be transmitted therethrough and block light incident from the outside in the implementation of an image, thereby improving the visibility of the organic light emitting display device.

At this time, the polarizing layer 812 and the compensating layer 813 are sealed by the adhesive, so that it is possible to prevent external moisture from penetrating into the polarizing layer 810. In addition, it is possible to prevent the generation of an initial crack in the polarizing layer 812 and the compensating layer 813 or the penetration of the initial crack. Accordingly, it is possible to prevent the polarizer 810 from being damaged due to the penetration of moisture and the generation of cracks. Since a polishing process for removing initial cracks is not required, the number of fabricating processes can be decreased, and fabricating cost can be reduced. In addition, it is possible to fabricate polarizers having various shapes, on which polishing using s polishing roll cannot be performed.

As described above, in the present disclosure, an adhesive is provided on one or more lateral surfaces of the polarizing layer of the polarizer, so that the propagation of a crack generated in the lateral surfaces of the polarizing layer can be prevented by the adhesion of the adhesive.

In the present disclosure, a polarizing layer is formed to have a smaller area than the protective films, and an adhesive is provided between the protective films disposed around the edges of the polarizing layer. Thus, the present disclosure can obtain advantages as follows.

First, in the present disclosure, the lateral surfaces of the polarizing layer is sealed by the adhesive, so that it is possible to prevent the penetration of moisture from the outside. In addition, the protective film may be made of an acrylic material having a hydrophobic characteristic, and the adhesive also includes an acrylic adhesive having a hydrophobic characteristic. Thus, it is possible to effectively prevent the penetration of moisture from the outside.

Second, in the present disclosure, it is possible to prevent a crack from being propagated toward inside of the polarizing layer. When an initial crack is generated in the polarizing layer due to external impact or the like in a process, the adhesive is filled in the initial crack. Thus, since the initial crack is firmly fixed by the adhesive, the initial crack is not grown. Furthermore, since the lateral surface having the initial crack formed therein is sealed by the adhesive, moisture and heat that result in the growth of the initial crack are blocked by the adhesive, so that the propagation of the initial crack can be prevented.

Although the above-described polarizers are illustrated as examples, the present disclosure is not limited to only the polarizers and polarizers including compensating layers, and may be applied to other films. For example, when a protective film is attached to an optical compensation layer or one of various kinds of functional layers for stereoscopic images by an adhesive so as to perform optical compensation or implement stereoscopic images, the adhesive is disposed on a side section of the optical compensation layer or the functional layer, so that it is possible to prevent a crack generated in the layer from being propagated to the inside of the layer.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A polarizer, comprising:
   a polarizing layer;
   a first protective film on a first surface of the polarizing layer, an area of a surface of the first protective film parallel to the first surface larger than an area of the first surface of the polarizing layer;
   a second protective film on a second surface of the polarizing layer, an area of a surface of the second protective film parallel to the second surface larger than the area of the second surface of the polarizing layer; and
   an adhesive between the first protective film and the second protective film, wherein the adhesive covers one or more edges of the polarizing layer,
   wherein a lateral surface of the adhesive is in contact with and disposed on a same plane as both a corresponding lateral surface of the first protective film and a corresponding lateral surface of the second protective film, and extends continuously between the lateral surface of the first protective film and the lateral surface of the second protective film.

2. The polarizer of claim 1, wherein the adhesive is a hydrophobic material that includes one or more kinds of acrylic monomers having a hydrophilic functional group.

3. The polarizer of claim 1, wherein the adhesive covers entire edges of the polarizing layer.

4. The polarizer of claim 1, wherein a thickness of the adhesive at the one or more edges of the polarizing layer is 1 μm to 10 μm, and a width of the adhesive that covers the one or more edges of the polarizing layer is 1 μm to 1.5 mm.

5. The polarizer of claim 1, wherein the one or more edges of the polarizing layer covered by the adhesive have one or more cracks.

6. The polarizer of claim 5, wherein the one or more cracks contain a crack having a size of 40 μm or more.

7. The polarizer of claim 5, wherein the polarizing layer has a stretching axis, and wherein the adhesive covers edges of the polarizing layer from which cracks in the edges propagate in a direction parallel to the stretching axis.

8. The polarizer of claim 5, wherein the polarizing layer has a stretching axis, and wherein the one or more edges of the polarizing layer having the one or more cracks includes edges along a first direction parallel to the stretching axis and edges extending in a second direction perpendicular to the first direction.

9. The polarizer of claim 1, further comprising a compensating layer that receives incident light and outputs light having a polarization state different from a polarization state of the incident light.

10. The polarizer of claim 9, wherein the compensating layer includes one or both of a quarter-wave retardation plate (QWP) or a half-wave retardation plate (HWP).

11. The polarizer of claim 9, wherein the adhesive is curable by a ultraviolet light of a first wavelength range and the compensating layer is curable by ultraviolet light curable by a second wavelength range different from the first wavelength range.

12. The polarizer of claim 9, wherein the compensating layer includes an alignment layer and a liquid crystal layer on the alignment layer, and wherein a bottom surface of the alignment layer contacts the adhesive.

13. The polarizer of claim 9, wherein the area of the surface of the first protective film and the area of the surface of the second protective film is greater than an area of a surface of the compensating layer parallel to the first surface, and wherein the adhesive covers one or more edges of the compensating layer.

14. The polarizer of claim 1, wherein the polarizing layer has a concave shape, is curved, is polygonal, or has a hole.

15. A display device including a polarizer, the polarizer comprising:
 a polarizing layer;
 a first protective film on a first surface of the polarizing layer, an area of a surface of the first protective film parallel to the first surface larger than an area of the first surface of the polarizing layer;
 a second protective film on a second surface of the polarizing layer, an area of a surface of the second protective film parallel to the second surface larger than the area of the second surface of the polarizing layer; and
 an adhesive between the first protective film and the second protective film, wherein the adhesive covers one or more edges of the polarizing layer,
 wherein a lateral surface of the adhesive is in contact with and disposed on a same plane as both a corresponding lateral surface of the first protective film and a corresponding lateral surface of the second protective film, and extends continuously between the lateral surface of the first protective film and the lateral surface of the second protective film.

16. A method of fabricating a polarizer, comprising:
 shaping a polarizing film to form a polarizing layer;
 attaching a first protective film on a first surface of the polarizing layer, an area of a surface of the first protective film parallel to the first surface larger than an area of the first surface of the polarizing layer;
 applying an adhesive on the polarizing layer to cover one or more edges of the polarizing layer;
 attaching a second protective film on a second surface of the polarizing layer, an area of a surface of the second protective film parallel to the second surface larger than the area of the second surface of the polarizing layer;
 curing the adhesive to secure the first protective film and the second protective film to the polarizing layer; and
 cutting the first protective film, the second protective film, and the adhesive along a shape of the polarizing layer such that a lateral surface of the adhesive is in contact with and disposed on a same plane as both a corresponding lateral surface of the first protective film and a corresponding lateral surface of the second protective film, and extends continuously between the lateral surface of the first protective film and the lateral surface of the second protective film.

17. The method of claim 16, wherein the polarizing film is shaped with the polarizing film adhered to a guide film.

18. The method of claim 17, further comprising removing the guide film after attaching the first protective film on the first surface of the polarizing layer.

19. The method of claim 16, wherein the one or more edges of the polarizing layer have one or more cracks, and the adhesive fills in the one or more cracks in the polarizing layer.

20. The method of claim 16, wherein curing the adhesive comprises irradiating ultraviolet light of a first wavelength range onto the adhesive.

21. The method of claim 16, further comprising shaping the first protective film and the second protective film such that boundaries of the first protective film and the second protective film extend further from a boundary of the polarizing layer.

22. The method of claim 16, further comprising:
 forming a compensating film of at least one layer on the polarizing film; and
 shaping the compensating film to form a compensating layer.

23. The method of claim 22, wherein the shaping of the compensating film is simultaneously performed with the shaping of the polarizing film.

24. The method of claim 22, wherein curing the adhesive comprises irradiating ultraviolet light of a first wavelength range onto the adhesive, and wherein the compensating film of the at least one layer comprises a layer of ultraviolet curable liquid crystal, and wherein the forming of the compensating film comprises:
 applying the ultraviolet curable liquid crystal onto the polarizing film; and
 curing the ultraviolet curable liquid crystal by irradiating ultraviolet light of a second wavelength range different from the first wavelength range onto the ultraviolet curable liquid crystal.

* * * * *